Dec. 30, 1969 J. PIGNONE 3,486,807

PHOTOGRAPHIC ENLARGER

Filed Dec. 11, 1967 16 Sheets-Sheet 1

JOSEPH PIGNONE
INVENTOR.

BY Rudolph J. Juick
ATTORNEY

JOSEPH PIGNONE
INVENTOR.
BY Rudolph J. Juick
ATTORNEY

Dec. 30, 1969 J. PIGNONE 3,486,807

PHOTOGRAPHIC ENLARGER

Filed Dec. 11, 1967 16 Sheets-Sheet 3

JOSEPH PIGNONE
INVENTOR.

BY Rudolph J. Junick
ATTORNEY

JOSEPH PIGNONE
INVENTOR.
BY Rudolph J. Jurick
ATTORNEY

JOSEPH PIGNONE
INVENTOR.

BY Rudolph J. Janick
ATTORNEY

JOSEPH PIGNONE
INVENTOR.

BY Rudolph J. Jimick
ATTORNEY

JOSEPH PIGNONE
INVENTOR.

BY Rudolph J. Juick
ATTORNEY

JOSEPH PIGNONE
INVENTOR.

BY Rudolph J. Juick
ATTORNEY

Dec. 30, 1969 J. PIGNONE 3,486,807

PHOTOGRAPHIC ENLARGER

Filed Dec. 11, 1967 16 Sheets-Sheet 9

JOSEPH PIGNONE
INVENTOR.

BY Rudolph J. Jusick
ATTORNEY

Dec. 30, 1969 J. PIGNONE 3,486,807

PHOTOGRAPHIC ENLARGER

Filed Dec. 11, 1967 16 Sheets-Sheet 10

JOSEPH PIGNONE
INVENTOR.

BY Rudolph J. Juick
ATTORNEY

JOSEPH PIGNONE
INVENTOR.

BY Rudolph J. Quick
ATTORNEY

JOSEPH PIGNONE
INVENTOR.
BY Rudolph J. Jumick
ATTORNEY

JOHN PIGNONE
INVENTOR.

BY Rudolph J. Juvick
ATTORNEY

JOSEPH PIGNONE
INVENTOR.

BY Rudolph J. Jirick
ATTORNEY

JOSEPH PIGNONE
INVENTOR.

BY Rudolph J. Jurick
ATTORNEY

JOSEPH PIGNONE
INVENTOR.
BY Rudolph J. Quick
ATTORNEY

United States Patent Office 3,486,807

Patented Dec. 30, 1969

3,486,807

PHOTOGRAPHIC ENLARGER

Joseph Pignone, West Orange, N.J., assignor to Charles Beseler Company, East Orange, N.J., a partnership Filed Dec. 11, 1967, Ser. No. 689,686

Int. Cl. G03b *27/56*

U.S. Cl. 355—62 25 Claims

ABSTRACT OF THE DISCLOSURE

Apparatus for making enlarged prints from photographic negatives and having condenser, negative and lens stages independently adjustable along a vertical track removably secured to a carriage, which carriage is movable between frame members extending upwardly from a base. The negative stage and the lens stage also are independently tiltable relative to the optical axis of the apparatus. Components carried by the base are electrically connected to components carried by the carriage, by contact fingers which are carried by the carriage and are in sliding engagement with bus bars carried by the frame members.

Background of the invention

The invention relates to photographic enlargers having upper bellows disposed between a condenser stage and a negative stage, and lower bellows disposed between the negative stage and a lens stage. A negative is positionable in a light beam and the stages are adjustable to project a sharp image upon photographic paper disposed on a flat baseboard of the enlarger.

Photographic enlargers of various constructions and arrangements are known but these suffer from various shortcomings which limit their versatility and speed of operation. In general, the mechanisms for effecting axial and angular adjustments of components, to produce a sharply focused image, are not constructed and positioned for maximum convenience of use and precise, positive operation.

In an enlarger made in accordance with this invention, all mechanical adjustment members and electrical control members are positioned within convenient reach of the operator from the front of the apparatus. Further, the mechanisms for effecting adjustments of the various movable members, along the vertical track of the apparatus, are constructed and arranged to provide a quick unlocking and locking action and a smooth mechanical movement.

Summary of the invention

The condenser, negative and lens stages are independently adjustable, axially of each other, along a vertical track removably secured to a carriage, said carriage being movable between upstanding frame members either manually or by means of an electric motor. Quick-action locking and unlocking mechanisms are provided for setting the stages in desired, fixed positions along the track. The negative stage is constructed so that the insertion of a negative carrier into proper optical position is a quick, one-hand operation. The negative stage and the lens stage also are individually tiltable relative to the optical axis of the apparatus, thereby to provide distortion control, the degree of tilt of each stage being indicated on a graduated scale. Electrical connections to the various movable components carried by the carriage are made by means of flexible brushes carried by the carriage and in slidable engagement with bus bars carried by the frame members, and all of the operating controls are positioned at the front end of the apparatus.

An object of this invention is the provision of a photographic enlarger of improved construction affording maximum versatility and convenience in use.

An object of this invention is the provision of a photographic enlarger in which the negative and lens stages are adjustable axially and angularly relative to the optical axis of the apparatus.

An object of this invention is the provision of a photographic enlarger wherein the negative stage comprises upper and lower cooperating members coupled together by a self-locking linkage mechanism, said mechanism being operable to retain the upper member in spaced position to the lower member, thereby to facilitate the insertion of a negative carrier into optical position.

An object of this invention is the provision of a photographic enlarger comprising a carriage movable between upstanding frame members by an electric motor, a lamp disposed in a housing carried by the carriage, electrical components carried by a base, V-shaped bus bars carried by the frame members and connected to components carried by the base, and flexible contact brushes carried by the carriage and connected to the lamp and the motor, said contacts being in sliding engagement with the bus bars throughout the range of movement of the carriage.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like references, characters denote like parts in the several views.

Description of the preferred embodiments

Figure 1:
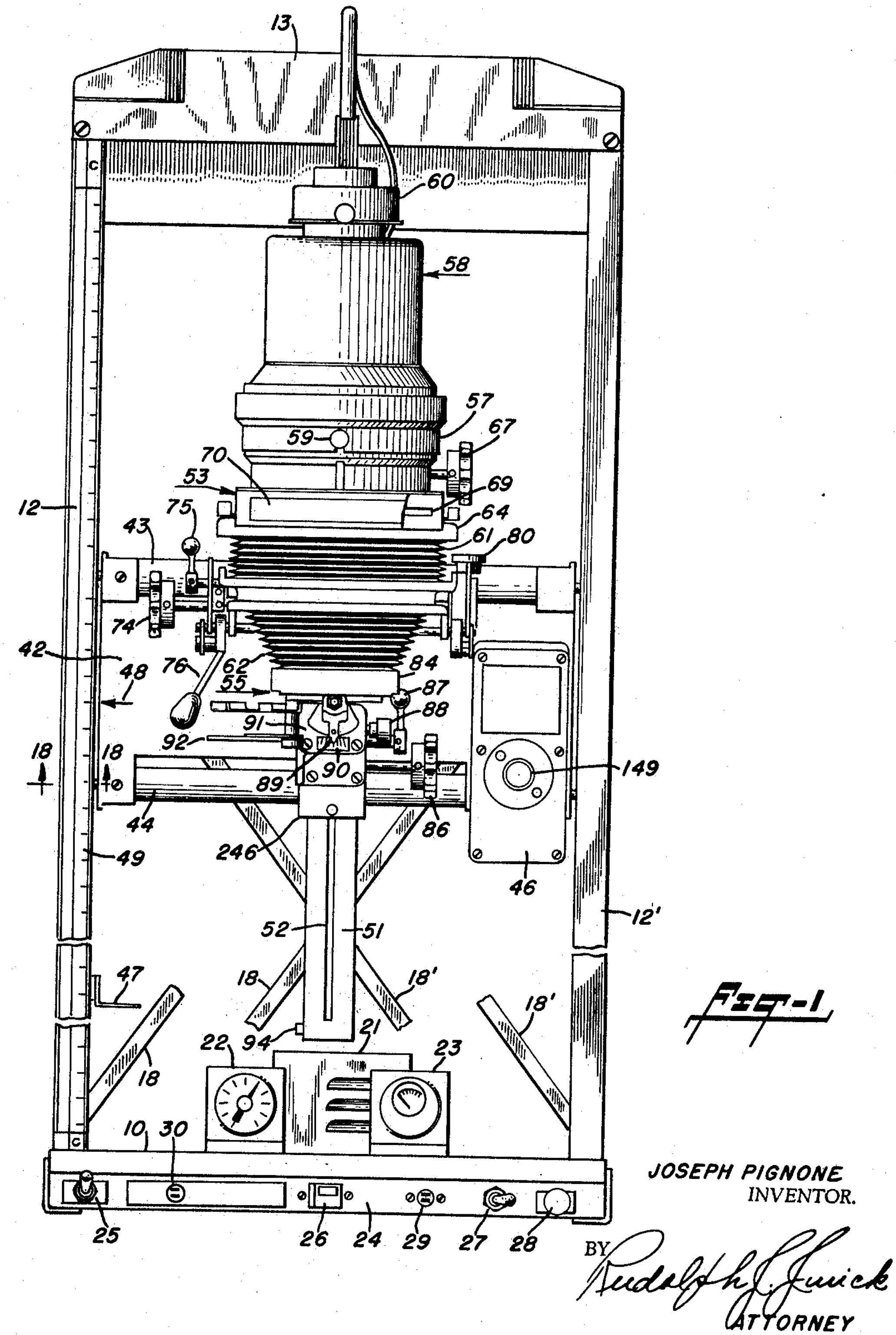
FIGURE 1 is a front elevational view of an enlarger made in accordance with this invention.

Referring to FIGURES 1–4, the numeral 10 designates a flat baseboard secured, by screws, to a rectangular, metal base frame 11. A pair of upstanding frame members 12, 12′, of generally U-shape in cross-section, have their lower ends secured to brackets, which brackets are removably secured to the base frame by the two bolts *c* and *c′*. The upper ends of these frame members are tied together by a cap member 13. Two struts 14, 14′ have threaded ends received in upper cleats 15, 15′, secured to the upright frame members, and lower cleats 16, 16′, which are secured to the base frame by the two bolts *b* and *b′*. Precise parallelism between the upstanding frame members is established by adjustment of the struts within the cleats, after which the struts are secured in fixed positions by means of the locking nuts 17, 17′. A pair of diagonal cross-braces 18, 18′ have their ends secured to the cleats. The described construction results in a rigid, vibration-free structure. At the same time, such construction permits separation of the frame members and the struts from the base frame, for shipping purposes, by merely removing the four bolts *b, b′, c* and *c′*.

Figure 2:
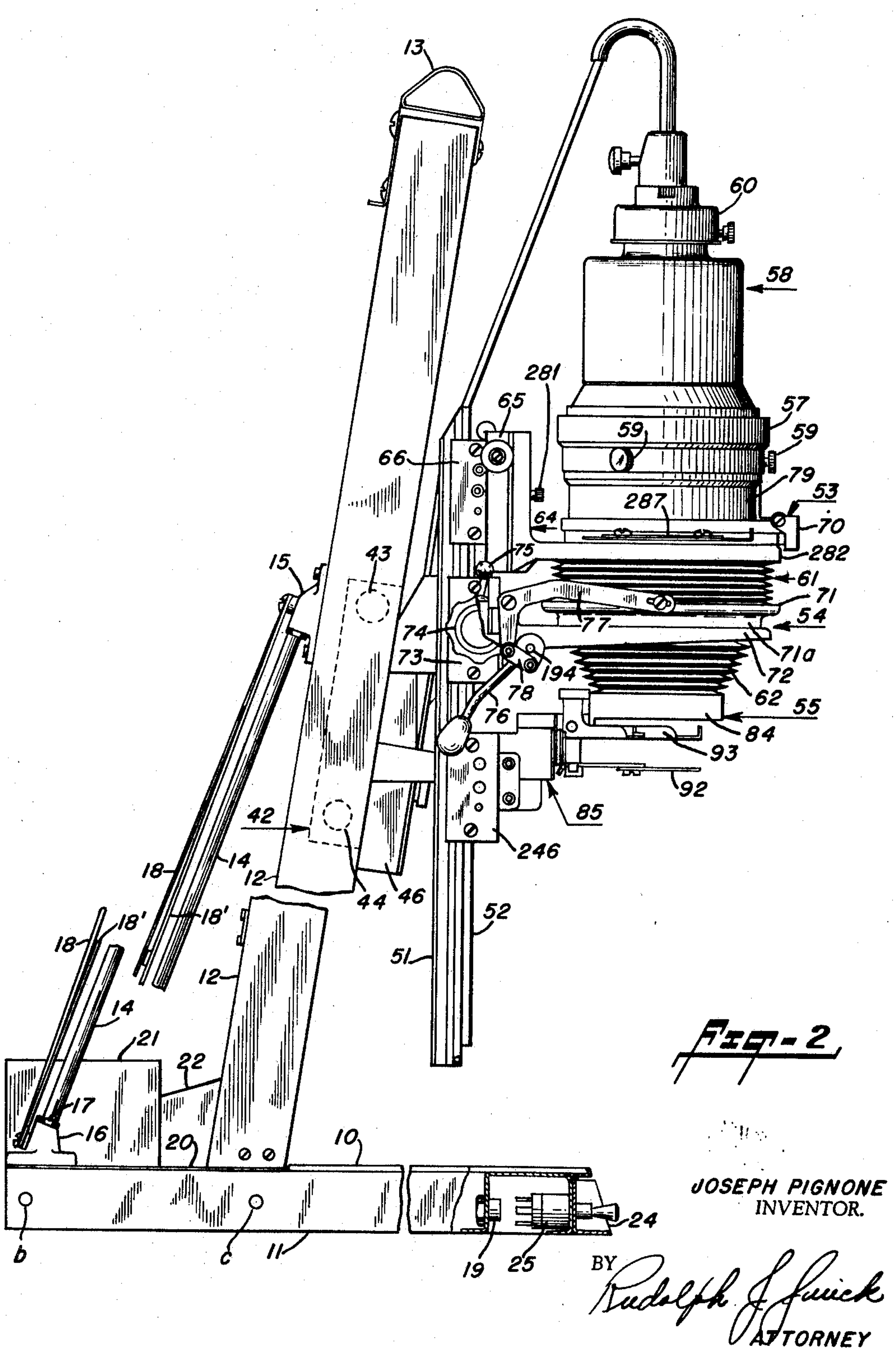
FIGURE 2 is a left, side elevational view thereof.

Disposed at the rear of the base frame is a removable panel 20 which carries a voltage regulator 21, a plug-in timer 22 and a combined voltmeter and rheostat 23. All of the electrical control switches, such as a carriage-elevating toggle switch 25, a main power line switch 26, a focus-control switch 27, an exposure-control push button switch 28, as well as outlet sockets 29 and 30 for connecting into the circuit accessory items such as foot-operated or remote switches, are carried by a front panel 24. Such panel, which extends across and is secured to the base frame 11, is of a generally inverted U-shape to form a compartment for the various switches and sockets, which members are connected into the electrical circuit of the apparatus by means of a flexible cable passing into the base frame through a grommet 19, as seen in FIGURE 2.

Figure 5:
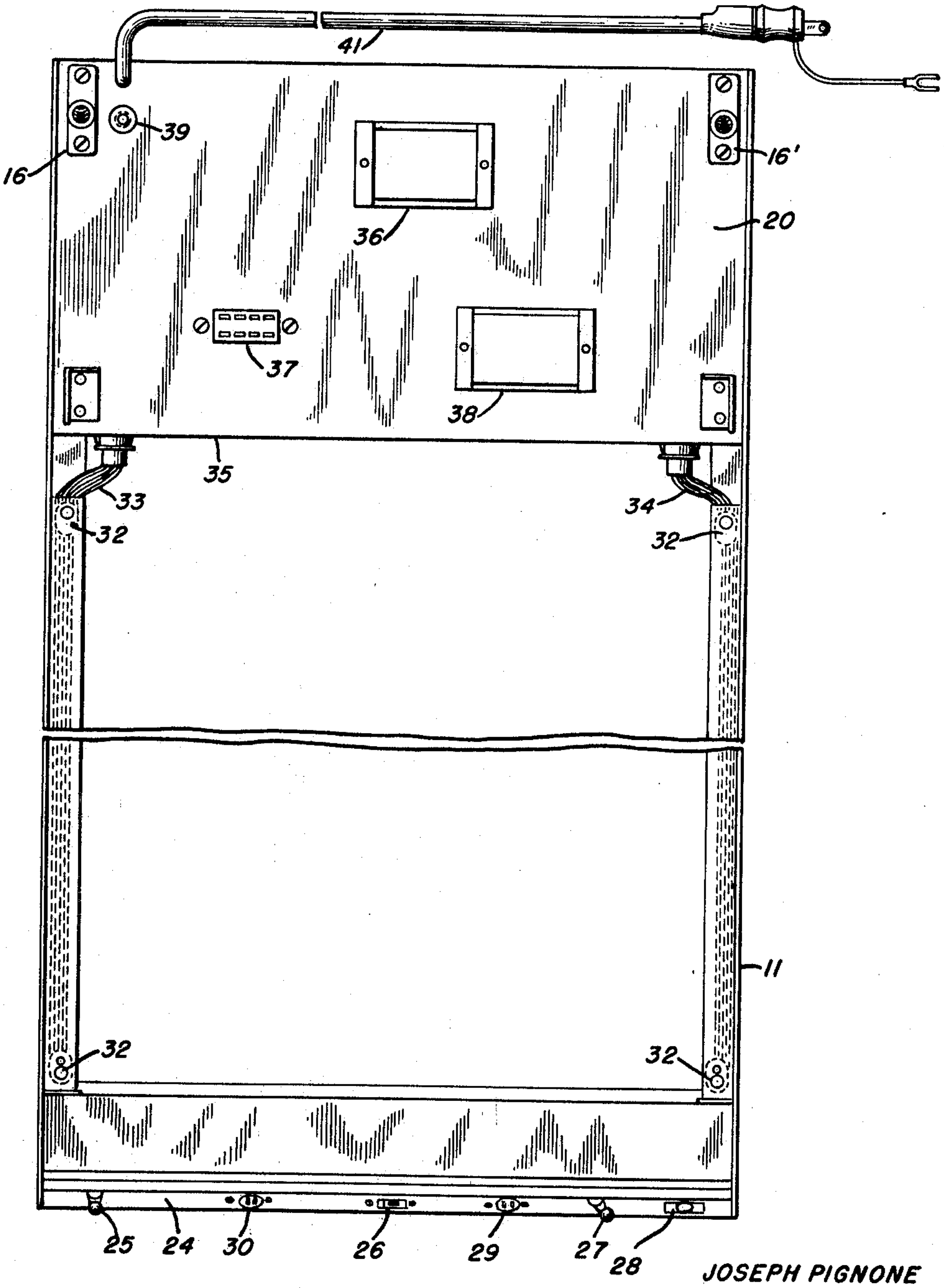
FIGURE 5 is a top plan view of the base of the apparatus, with the baseboard omitted.

FIGURE 5, to which reference now is made, is a top plan view showing the apparatus base with the flat baseboard removed. The base frame 11, formed of U-shaped channel irons, is provided with four tapped holes 32 for receiving the screws which secure the baseboard thereto. The components carried by the front panel 24 are connected into the electrical circuit by means of the flexible cables 33 and 34, which cables are positioned within the side channels of the base frame and provided with plug connectors for connections thereof to sockets carried by a vertical partition wall 35 spanning the side channels. Such sockets are connected to portions of the electrical circuit disposed below the rear panel 20 as well as to a socket 37 which receives the plug-connected timer. In FIGURE 5, the voltage regulator, timer and voltmeter have been omitted. Leads from the regulator and the voltmeter pass through the respective openings 36 and 38, provided in the panel 20, and are connected to suitable terminal blocks disposed under such panel. The panel 20 also carries a fuse 39 and a grommet accommodating the line cord 41.

Referring again to FIGURES 1–4, the carriage 42 is provided with integral, aligned lugs to which the ends of the spaced, metal tubes 43 and 44 are secured. These tubes carry shafts having ends projecting into the upstanding frame mmebers 12, 12′, which ends carry pinion gears in mesh with gear racks carried by the frame members. Also, these tubes contain helical springs arranged to counter-balance the weight of the carriage and the members carried thereby, all of which will be described in detail hereinbelow. An electric motor 45 (FIGURE 4) and a housing 46 (FIGURE 1) are carried by the carriage, said housing containing a suitable gearing system mechanically coupled to the shaft carrying the pinion gears, whereby energization of the motor for rotation in one or the other direction effects a raising or lowering of the carriage. Stops 47 and 47′ (see FIGURE 4) secured to the frame member 12, define the lower and upper limits of travel of the carriage. These stops are positioned to actuate suitable switches carried by the carriage, thereby to de-energize the motor. A fixed reference mark 48 (FIGURE 1) is provided on the forward face of the carriage, which mark cooperates with a calibrated scale 49 secured to the upright frame member 12. As will also be described in detail, below, a vertical track 51, provided with a slide bar 52, is removably secured to the carriage. This track carries the condenser stage 53, the negative stage 54 and the lens stage 55, see particularly FIGURE 2.

The condenser stage 53 is provided with a collar 57 for receiving the lamp housing 58, said housing being secured in place by the thumb screws 59. A cap 60, carrying a lamp socket, is removably attached to the upper end of the lamp housing to facilitate the insertion of interchangeable light sources into the housing. Those skilled in this art will understand that the condenser stage carries a lens system which collimates the light emanating from the lamp and directs a cone of light rays along a vertical optical axis and through the upper and lower bellows 61 and 62, respectively.

The condenser stage 53 is supported by a sturdy, L-shaped bracket 64, the square, horizontal arm of this bracket having a large opening formed therein for passage of the light beam to the negative stage. The vertical arm of this bracket is mechanically-coupled to a lift plate 65, which plate is, in turn, secured to a focusing block 66, the latter carrying a mechanism for moving the condenser stage along the track 51 and for locking the condenser stage in a desired position, as will be described in detail hereinbelow. For the present, it is pointed out that the adjustment of the condenser stage along the track is effected by rotation of the knob 67 (see FIGURE 3), and the locking and unlocking of the condenser stage, with respect to the track, is effected by means of the pivotally-mounted locking lever 68. Briefly, when the locking lever is in the illustrated, up position, the focusing block is securely locked to the track 51. Rotation of the lever in a counter-clockwise direction, to the down position, unlocks the mechanism, whereby rotation of the knob 67 in one or other direction results in an upward or downward displacement of the focusing block along the track. As will be seen by reference to FIGURES 1 and 2, a slot 69 is formed in the forward wall of the condenser box 79 for the insertion of a filter into the light beam, said slot normally being closed by a pivotally-mounted cover plate 70.

Figure 3:
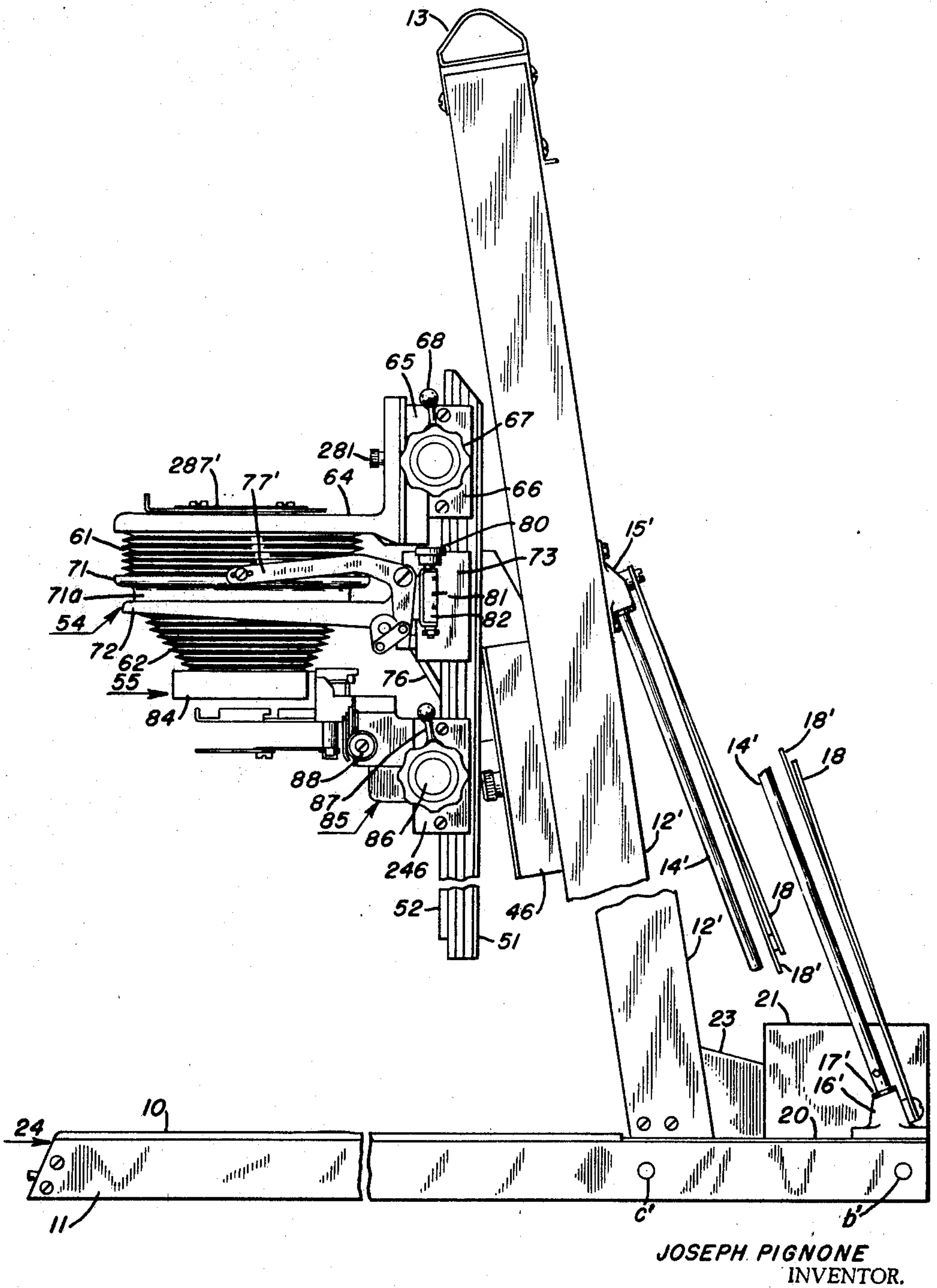
FIGURE 3 is a right, side elevational view thereof, with the condenser box and lamp housing omitted.

The negative stage 54 comprises two, square plates 71 and 72, the upper bellows 61 being secured to the plate 71 and the lower bellows 62 being secured to the plate 72. Formed integrally with the upper plate 71 is a downwardly depending collar **71*a*. Referring particularly to FIGURE 2, the lower plate 72 is pivotally-secured to a focusing block 73, which block houses the mechanism for moving the negative stage along the track 51 upon rotation of the knob 74. Such mechanism, the construction of which will be described hereinbelow, includes a locking lever 75. A linkage mechanism is mechanically-coupled to the two plates 71 and 72. This mechanism comprises a crankarm 77 having an end pivotally-connected to the upper plate 71 and an intermediate portion pivotally-connected to the focusing block 73. An operating lever 76 is pivotally-secured to the lower plate 72 and pivotally-coupled to the other end of the crankarm 77 by a link 78. A similar linkage mechanism is disposed on the opposite side of the negative stage, as shown in FIGURE 3. As will be described below, the described linkage mechanisms are spring-biased in such manner that they operate in unison, as a toggle mechanism. Specifically, and with reference to FIGURE 2, rotation of the operating lever 76 in a counter-clockwise direction results in an upward, axial displacement of the plate 71 and collar 71*a* relative to the lower plate 72. Once the lever has been rotated beyond the center point of the mechanism, the collar will be retained in the elevated position. A negative carrier now can be inserted between the two plates, after which the lever 76 is rotated back to the illustrated position whereby the negative carrier is clamped in place between the collar 71*a* and the plate 72**.

Referring particularly to FIGURES 2 and 3, the negative stage 54 also is tiltable with respect to the optical axis of the apparatus by rotation of the knob 80 carried by the focusing block 73. A fixed reference mark 81 cooperates with a scale 82, calibrated in angular degrees, to indicate the angular tilt of the negative stage. The construction and arrangement of the mechanism for tilting the negative stage will be described in detail hereinbelow.

The lens stage 55 comprises a housing member 84, carrying a focusing lens, and secured to a sturdy bracket generally identified by the numeral 85, which bracket is, in turn, secured to a focusing block 246. This focusing block is movable along the vertical track 51 upon release of the associated locking lever 87 and rotation of the knob 86. The construction and arrangement of the mechanism for effecting such operations is the same as that associated with the condenser stage. In addition, the lens stage also is tiltable relative to the optical axis of the apparatus upon rotation of the knob 88 (FIGURE 1), the degree of tilt being indicated by a pointer 89 taken with reference to a calibrated scale 90 carried by a cover plate 91. An assembly comprising a red filter 92 and a tray 93, for receiving additional filters, is pivotally attached to the block 85, such filters being individually rotatable from the nonfunctional positions shown in FIGURE 1 to the functional positions shown in FIGURE 2. The lower limit of travel of the lens stage is defined by a stop 94 secured to the track 51, see FIGURE 1.

Figure 4:
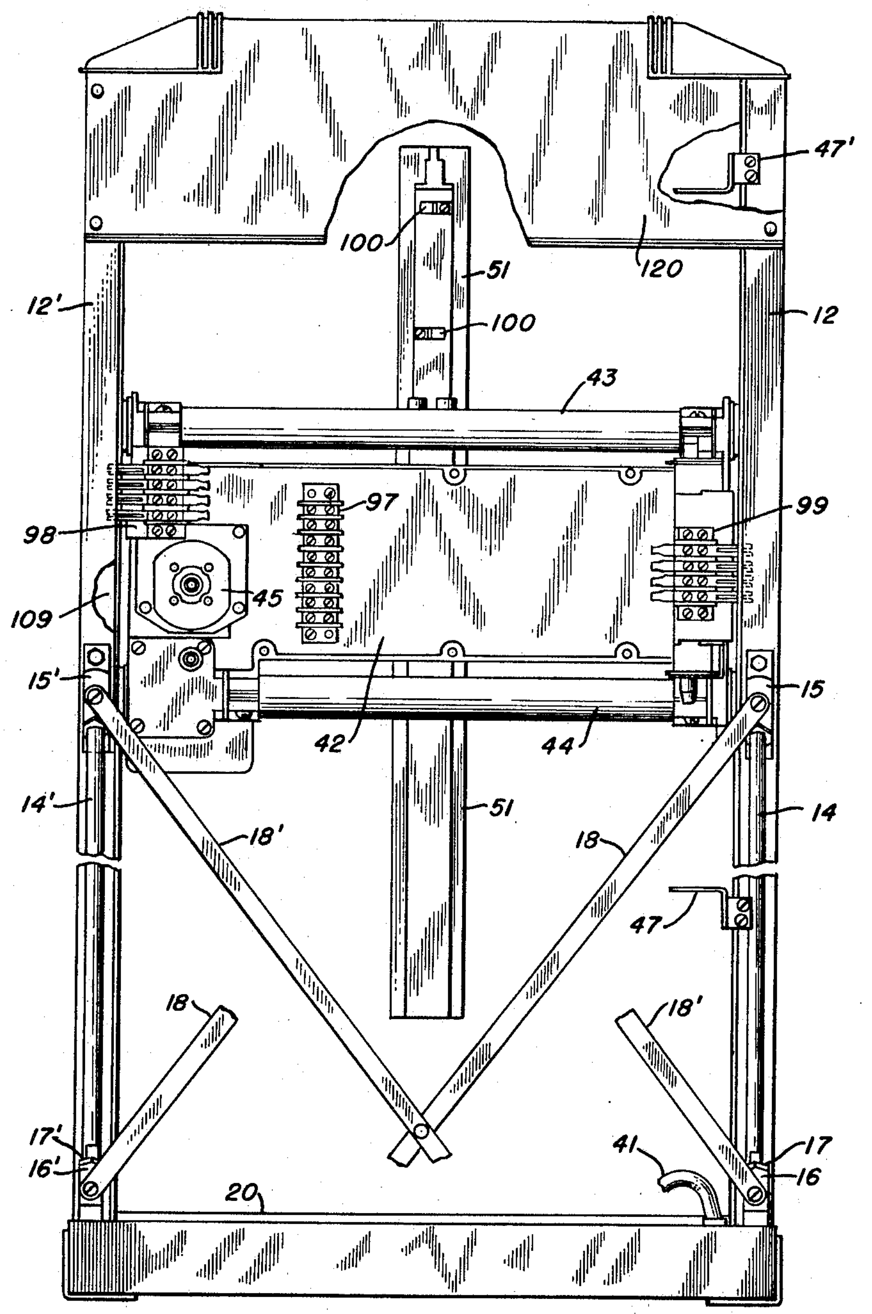
FIGURE 4 is a rear, elevational view thereof, with the lamp housing, condenser stage, negative stage and lens staged omitted.

Referring now to FIGURE 4, terminal blocks 97, 98 and 99 are secured to the rear surface of the carriage 42. The various electrical components carried by the carriage as, for example, the motor 45 and the lamp, are connected by leads, not shown, to the contacts of the terminal block 97, the lamp cord being secured in place by the clips 100. The contacts of the terminal block 97 are connected by color-coded jumpers, not shown, to contact brushes carried by the terminal blocks 98 and 99. Such brushes have bifurcated ends in sliding engagement with bus bars carried by the upright frame members 12 and 12′ as will now be described with reference to FIGURES 6–12.

Figure 6:
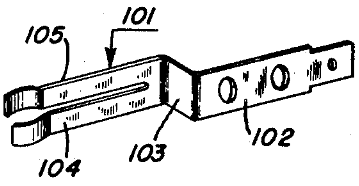
FIGURE 6 is an isometric view of one of the contact brushes carried by the carriage.

FIGURE 6 is an isometric view of one of the contact brushes identified by the numeral 101. Such brush, made of a spring material, as for example, Phosphor bronze, comprises a flat base portion 102, provided with two holes, an offset intermediate portion 103 and a bi-furcated end forming the fingers 104 and 105. The fingers diverge in opposite directions from a plane parallel to that of the base portion 102 and have reversely-disposed arcuate end portions.

Figure 8:
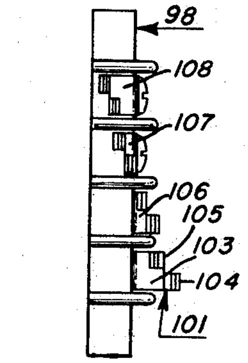
FIGURE 8 is a side elevational view thereof.
Figure 7:
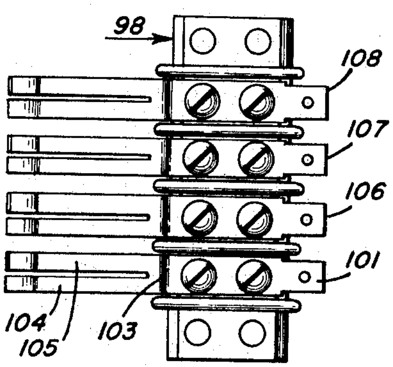
FIGURE 7 is a top plan view of a terminal block carrying four brushes.

Four contact brushes are secured to the terminal block 98 as shown in FIGURES 7 and 8 (see also FIGURE 4). These brushes are identical except for the length of the offset intermediate portions thereof. The offset intermediate portion 103 of the end brush 101 has a transverse length such that the fingers 104 and 105 are spaced a predetermined mean distance above the plane containing the upper surface of the terminal block. The offset, intermediate portion of the other end brush 108 is of the same transverse length but this brush is inverted, relative to the brush 101, so that its fingers are spaced a predetermined mean distance below the said plane. Similarly, the brushes 106 and 107 have offset intermediate portions of equal transverse length, which length, however, is less than that of the corresponding portions of the two end brushes. Thus, with the brushes 106 and 107 reversely-disposed relative to each other, the fingers of the four brushes lie substantially in spaced, parallel planes, the spacing of such planes corresponding to that of four V-shaped bus bars carried by the upright frame member, as will now be described.

Figure 9:
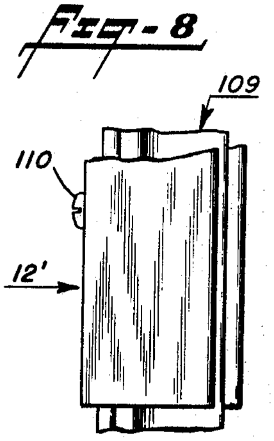
FIGURE 9 is a fragmentary rear elevational view of one of the upright frame members having the bus bar assembly secured thereto.
Figure 10:
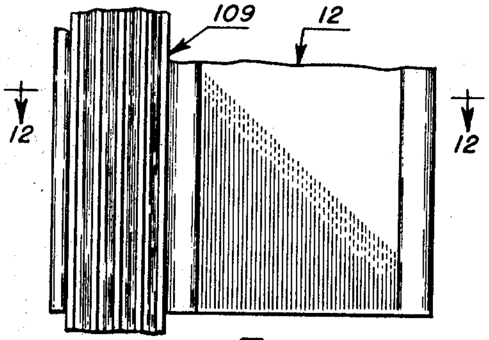
FIGURE 10 is a corresponding side elevational view.
Figure 11:
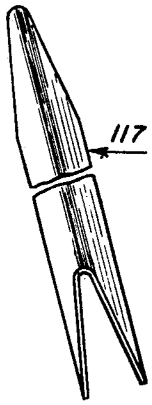
FIGURE 11 is a fragmentary isometric view of one of the bus bars.

FIGURES 9 and 10 are fragmentary end and rear elevational views, respectively, showing the frame member 12′ (see also FIGURE 4), to which frame member a bus bar assembly 109 is secured by the screws 110. As best shown in the enlarged, cross-sectional view of FIGURE 12, which view is taken along the line 12—12 of FIGURE 10, the frame member 12′, formed of extruded aluminum, includes integral walls defining channels 113, 114 and 115, the latter two channels accommodating various parts forming the mechanism for raising and lowering the carriage of the apparatus, as will be described hereinbelow. The channel 113 accommodates the bus bar assembly 109, which assembly comprises an elongated insulator member 116, having projecting walls defining four parallel channels, and four bus bars 117. The insulator member is made of a resilient material, such as polyethylene, and includes laterally-projecting lips 118 reducing the entrance openings of the channels. The bus bars, made of Phosphor bronze, are V-shaped, as shown in FIGURE 11, and the side edges thereof normally are spaced apart a distance greater than the width of the channels formed in the insulator member. Thus, when the bus bars are pressed into the channels of the insulator member, as shown in FIG- URE 12, the curved central portions abut the base walls of the channels and the side edges underly and engage the lips 118. In this arrangement, the lips prevent lateral separation of the bus bars from the insulator member and the pressure exerted against the proximate walls by the now-compressed bus bars prevents axial displacement thereof. The assembly is now pressed into the channel 113 and secured in fixed position by means of the screws 110.

Referring again to FIGURE 4, the described bus bar assembly 109 extends substantially the full length of the upright frame member 12', the lower end of the assembly extending somewhat below the rear panel 20 for the purpose of making hidden electrical connections to the bus bars. Such connections can be made by leads soldered to exposed ends of the bus bars or by means of reversely-bent Phosphor bronze clips slidable insertable between each of the bus bars. The upper end of the bus bar assembly terminates approximately at the face plate 120 secured across the two frame members 12 and 12'. The terminal block 98, carrying the described four brushes is secured to the rear surface of the carriage 42 in a position such that the bi-furcated ends of each contact brush project into the associated bus bars.

Due to the initial spread imparted to the fingers of each contact brush, the reversely-disposed arcuate end portions of a given brush are pressed against opposed walls of the associated bus bar. Consequently, a good, sliding electrical contact is provided between each brush and the associated bus bar through-out the range of movement of the carriage. The other upright frame member 12 carries a similar bus bar assembly and the associated terminal block 99 carries a similar set of four contact brushes having ends in sliding engagement with associated bus bars.

Figures 13, 14:
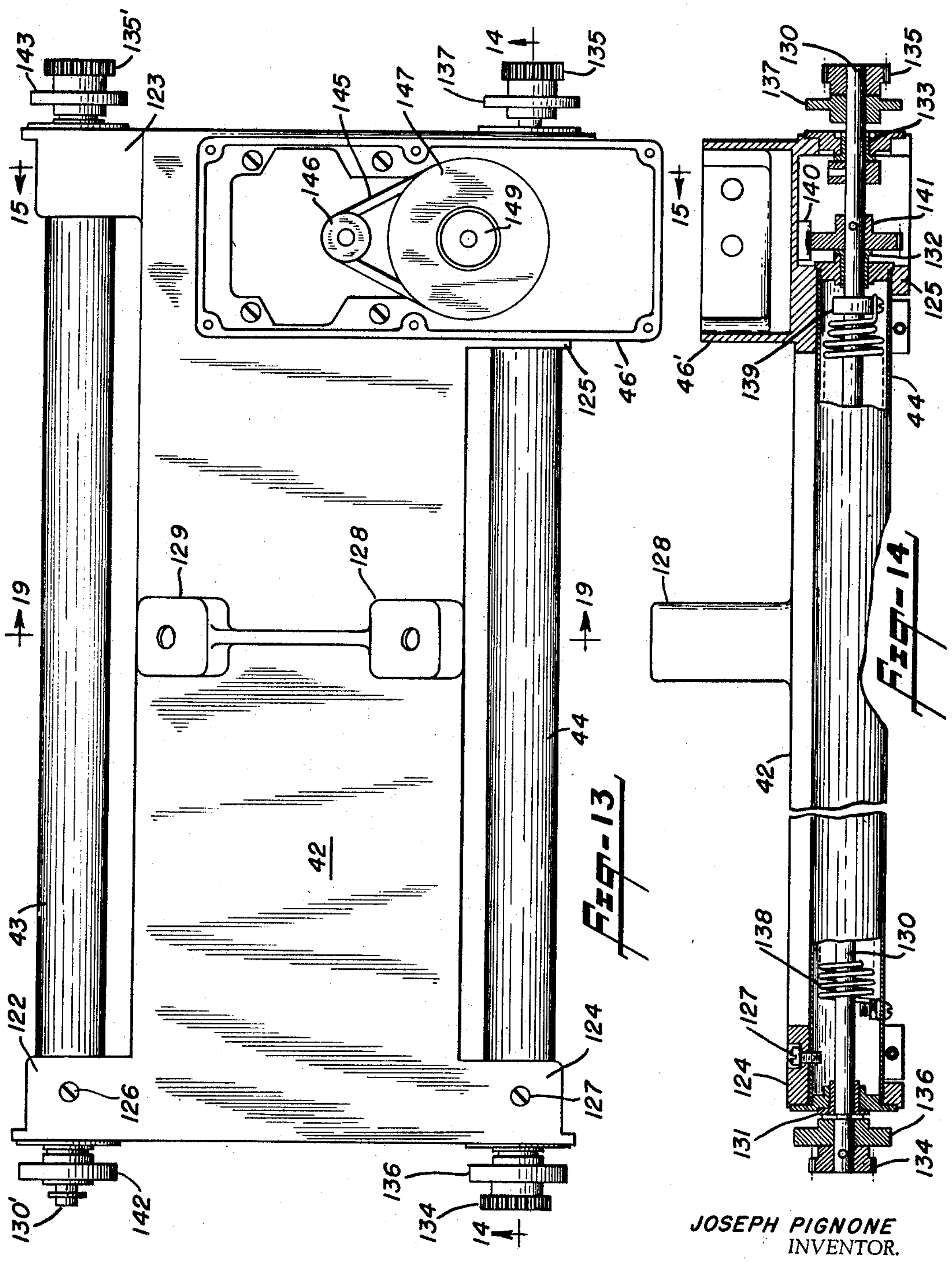
FIGURE 13 is a front elevational view of the carriage.
FIGURE 14 is a cross-sectional view taken along the line 14—14 of FIGURE 13.

Reference now is made to FIGURES 13 and 14 showing the carriage 42 carrying the tubes 43 and 44, the ends of the tube 43 being disposed within the aligned carriage lugs 122, 123 and the ends of the tube 44 being disposed in the aligned lugs 124, 125. These lugs are integral with the carriage and the said tubes are secured in fixed positions by the screws 126, 127. Also formed integrally with the carriage are forwardly-extending seats 128 and 129 and a housing 46'. The housing 46' corresponds to the previously-referred to gear box and identified by the numeral 46 in FIGURES 1 and 3. Each seat is provided with a hole for receiving a bolt by means of which the vertical track of the apparatus is secured to the carriage, as will be described below with specific reference to FIGURE 19. Referring particularly to FIGURE 14, a shaft 130 extends through the tube 44 and is rotatable in the left sleeve bearing 131, carried by an end plate secured to the lug 124, and the two right, sleeve bearings 132 and 133. Identical spur gears 134 and 135 are secured to the ends of the shaft, as by roll pins, said gears preferably being made of a suitable plastic. Plastic rollers 136 and 137 are rotatable on the shaft. As will be described hereinbelow, these gears and rollers extend into channels formed in two upright frame members, with the gears in mesh with gear racks carried by the frame members. A coiled spring 138, encircles the shaft, such spring having one end secured to the tube 44 and the other end secured to a collar 139 which is secured to the shaft, whereby the spring force applied to the shaft varies in correspondence with shaft rotation. The shaft is rotatable by a pinion gear 141 secured to the shaft and in mesh with a worm gear 140 which is frictionally coupled to the drive shaft of the electric motor, as will be described with reference to FIGURE 15. It is here pointed out that the upper tube 43, FIGURE 13, carries a shaft 130' carrying the rollers 142 and 143 and a gear 135'. The gear 135' corresponds to the lower gear 135, and the rollers 142 and 143 correspond respectively to the lower rollers 136 and 137. Also, the upper tube 43 carries a coiled spring constructed and arranged as has been described with reference to the spring 138 shown in FIGURE 14. These coiled springs, however, are arranged to operate in reverse directions upon movement of the carriage in a given direction, that is, the one spring unwinds as the other winds about their associated shafts. An initial tension is applied to the springs to provide a force which counter-balances the weight of the carriage and the members attached thereto, such force remaining constant through-out the full range of movement of the carriage by reason of the reverse arrangement of the springs.

Figure 15:
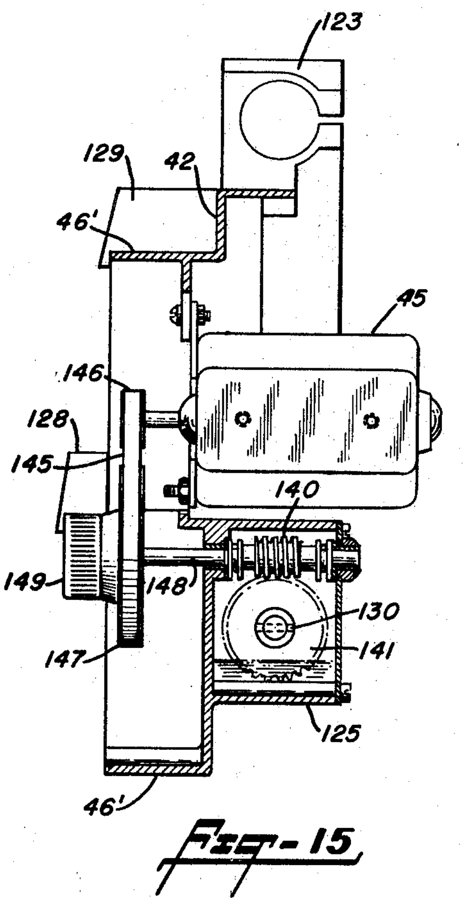
FIGURE 15 is a cross-sectional view taken along the line 15—15 of FIGURE 13.

FIGURE 15, which is a cross-sectional view taken along the line 15—15 of FIGURE 13, shows the focusing motor 45 provided with a mounting plate which is secured to a partition wall of the housing 46'. A V-belt 145, operating over pulleys 146, 147, frictionally couples the motor drive shaft to a shaft 148 carrying the worm gear 140 which is in mesh with the pinion gear 141 secured to the shaft 130. A knob 149 (see also FIGURE 1), secured to the projecting end of the shaft 148, is provided for manual elevation and lowering of the carriage.

Figure 16:
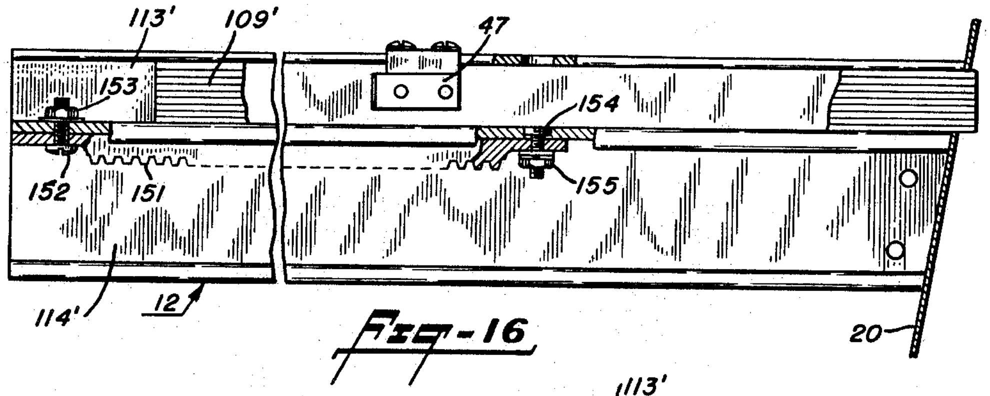
FIGURE 16 is a side elevational view showing one of the upright frame members having the bus bar assembly and a gear rack secured thereto in operative positions.
Figure 17:
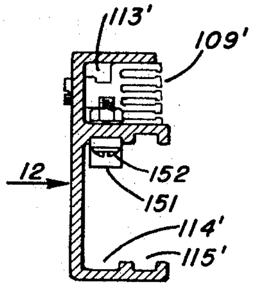
FIGURE 17 is a top, plan view thereof.

Reference now is made to FIGURES 16 and 17, which are rear elevational and top end views, respectively, of the upright frame member 12, which frame member has the same cross-sectional configuration as the frame member 12' (shown in FIGURE 12), and having corresponding channels 113', 114' and 115'. Secured within the channel 113' is a corresponding bus bar assembly 109'. One end of the bus bar asssembly projects below the lower end of the frame member 12 and through an opening formed in the rear plate 20 (see also FIGURE 2). Electrical connections to the bus bars are made below the plate 20. The other end of the bus bar assembly terminates at a point spaced from the upper end of the frame member. Disposed within the channel 114' is a gear rack 151, the upper end of said rack being secured to a side wall of the channel by a screw 152 and cooperating nut 153. The lower end of the gear rack is similarly secured in place by the screw 154 and cooperating nut 155, said screw having a flat head recessed in the wall so as not to form an obstruction to the bus bar assembly. The lower end of the gear rack terminates at a point spaced from the lower end of the frame member, which point is determined by the length of the vertical track 51 shown in FIGURE 2.

Figure 12:
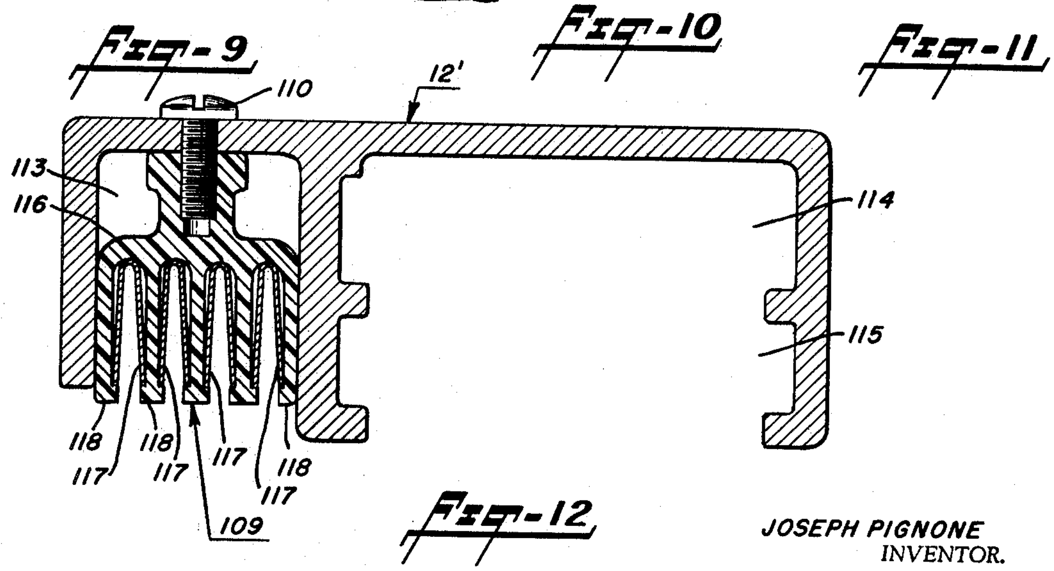
FIG. 12 is an enlarged cross-sectional view taken along the line 12—12 of FIGURE 10.
Figure 18:
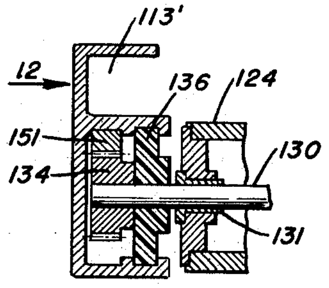
FIGURE 18 is a cross-sectional view taken along the line 18—18 of FIGURE 1 but with the bus bar assembly omitted.

As shown in FIGURE 18, which is a cross-sectional view taken along the line 18—18 of FIGURE 1, the spur gear 134 (see also FIGURE 13) is in mesh with the teeth of the gear rack 151. The relatively-wide roller 136 is disposed within the forward channel of the frame member 12, thereby eliminating any side play between the carriage and the frame member. The corresponding, upper roller 142, see FIGURE 12, is of the same diameter as the roller 136 but has a somewhat thinner flange portion. Thus, the peripheral surfaces of both rollers are at all times in engagement with the side walls of the channel, thereby eliminating any play between the carriage and the frame member in a transverse plane corresponding to that of the paper. The upper and lower rollers 143 and 137, shown in FIGURE 12, operate in a similar manner within the forward channel of the other upright frame member.

Figures 19, 20, 22, 24:
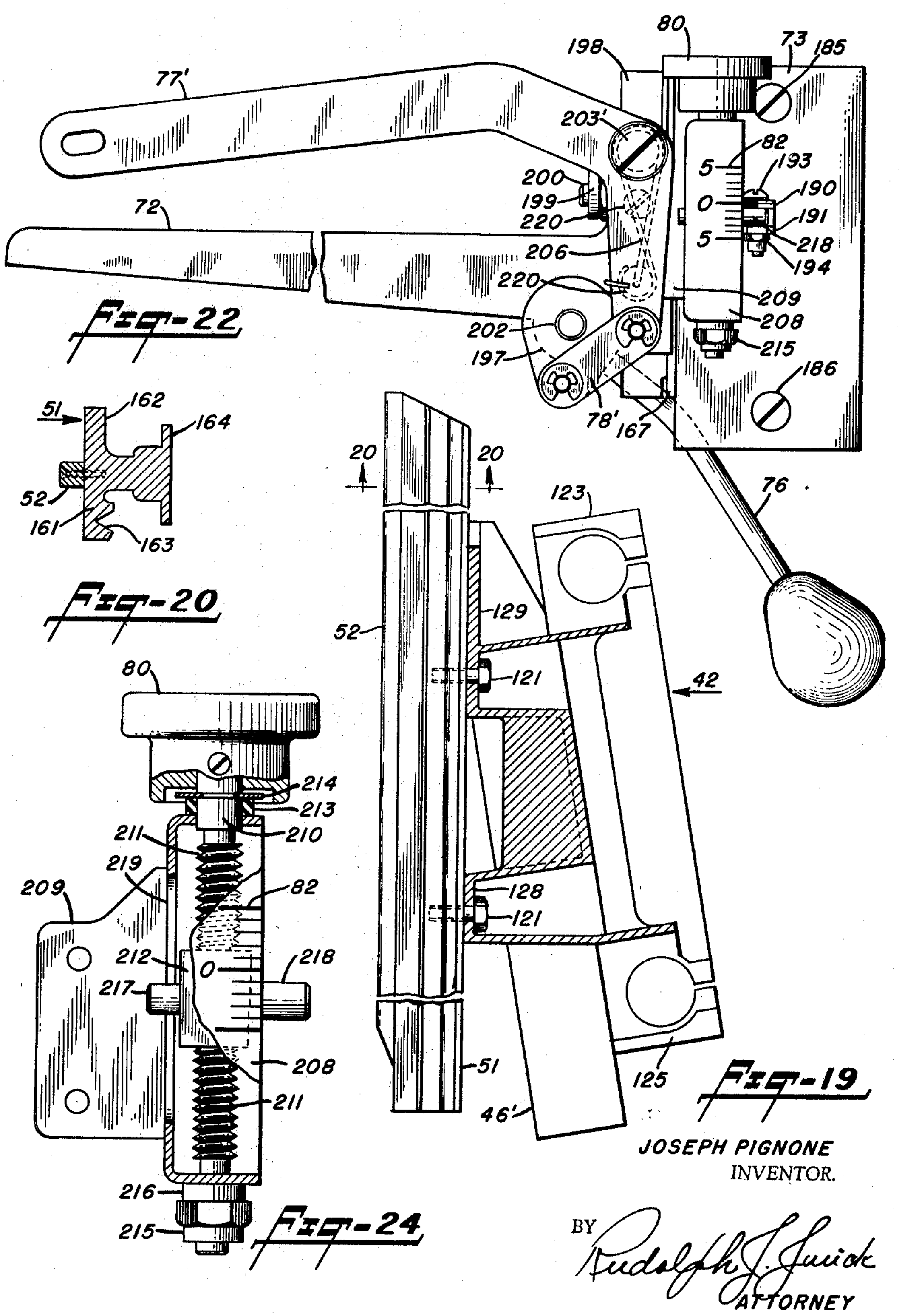
FIGURE 19 is a cross-sectional view of the carriage taken along the line 19—19 of FIGURE 13, with the vertical track secured thereto.
FIGURE 20 is a cross-sectional view of the vertical track taken along the line 20—20 of FIGURE 19.
FIGURE 22 is a side elevational view thereof.
FIGURE 24 is an enlarged, side elevational view with parts broken away to show the arrangement for tilting the negative stage relative to the optical axis of the apparatus.

The attachment of the vertical track to the carriage is shown in FIGURE 19 which is a cross-sectional view taken along the line 19—19 of FIGURE 13 but with the two shafts and springs omitted. Here are shown the two carriage seats 128 and 129, the lugs 123 and 125 and the gear box housing 46'. The track 51 is secured to the carriage seats 128 and 129 by the two bolts 121.

The configuration of the track 51 is shown in FIGURE 20 which is a cross-sectional view taken along the line 20—20 of FIGURE 19. The slide bar 52 is secured to the flat, front surface of the main body portion 161 by a plurality of screws having heads recessed in bores formed in the slide bar. The rear surface of this body portion includes a flat surface 162 and a V-shaped groove 163. A flat tail portion 164 is of a width to provide stable engagement with the seats of the carriage.

Figures 21, 23:
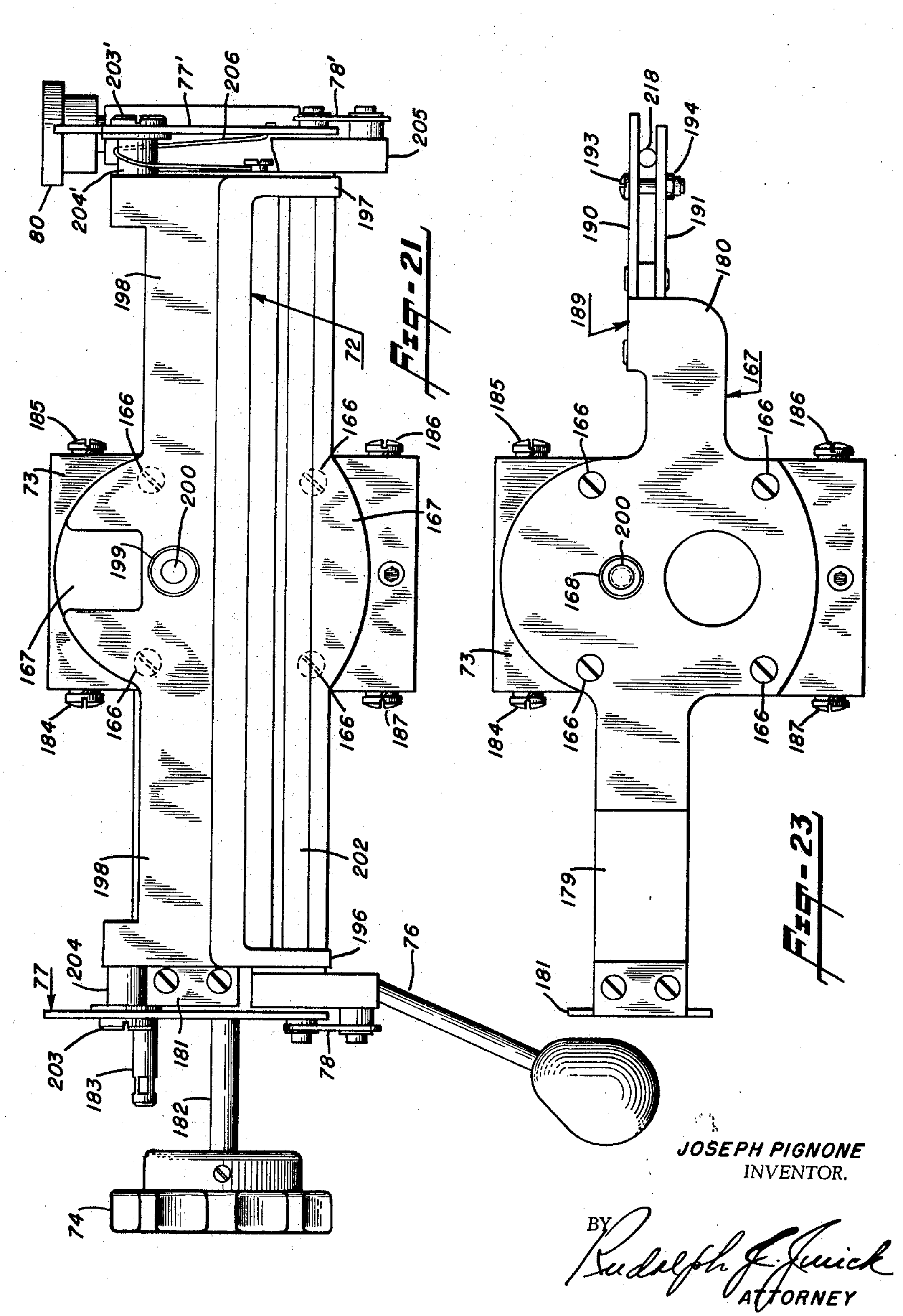
FIGURE 21 is a front elevational view of the negative stage.
FIGURE 23 is a front elevational view of the tilt bracket of the negative stage.

The construction and assembly of the negative stage will now be described with reference to FIGURES 21–23. These figures show the U-shaped focusing block 73 which is slidable along the vertical track of the apparatus, see also FIGURES 2 and 3. Secured in fixed position to the forward face of the focusing block 73, by the four screws 166, is a tilt bracket 167, the configuration of which is shown in FIGURE 23. This bracket has a central portion in flush engagement with the focusing block and provided with a clearance hole 168, and oppositely-extending arms 179 and 180. An L-shaped bracket 181 is secured to the end of the arm 179, said bracket having two holes formed therein and forming a shaft guide. Specifically, the shafts 182 and 183, FIGURE 21, pass through such holes and into the focusing block 73, the shaft 182 having the focusing knob 74 attached thereto. The associated locking lever is attachable to the shaft 183, see lever 75 shown in FIGURES 1 and 2. Disposed within the block 73 are components carried by the shafts 182, 183 and cooperating components secured in place by the screws 184–187. These components co-act with the vertical track to effect a vertical displacement of the negative stage to a desired position and to lock the stage in the desired position, as will be described below. The other arm 180, of the lift bracket 167, (FIGURE 23) has an offset end portion 189 terminating in a flat tongue 190 lying in a plane normal to that of the bracket. A second, flat tongue 191 is riveted to the offset end portion 189 and spaced from the tongue 190. A screw 193, passing through aligned holes formed in the tongues, and the nut 194 provide a means for adjusting the tongue spacing for purposes which will be described hereinbelow.

The lower plate 72, of the negative stage (FIGURE 21), is a single casting including the downwardly-depending ears 196, 197 and an upwardly-extending flat portion 198, said flat portion being pivotally-attached to the focusing block 73 by a nut 199, which nut is threaded onto a stud 200 riveted to the block and passing through the clearance hole 168 formed in the tilt bracket 167, see FIGURE 23. A shaft 202 extends through aligned holes formed in the ears 196, 197 and the operating lever 76 is secured to one end of this shaft, as by a set screw. Such lever is pivotally-coupled to the crankarm 77, by the link 78, said crankarm having an intermediate portion pivotally-secured to the left end of the upwardly-extending flat portion 198, of the lower plate 72, by means of a screw 203 and bushing 204. An elongated slot is formed at the free end of the crankarm for receiving a fastening screw by means of which the crankarm is pivotally attached to the upper plate 71 of the negative stage, see FIGURE 2. A similar crankarm 77′ is pivotally-secured to the right end of the upstanding portion 198 of the plate 72, by means of the screw 203′ and bushing 204′. This crankarm is pivotally-coupled to a lift block 205, by means of the link 78′, which lift block is secured to the end of the shaft 202. The described, two linkage mechanisms operate simultaneously upon rotation of the lever 76, rotation of the lever in a clockwise direction, as viewed in FIGURE 22, resulting in an elevation of the ends of both crankarms away from the lower plate 72. A spring 206, having one end secured to the plate 72 and the other end looped about the crankarm 77′, establishes a biasing force to provide a toggle action, that is, when the lever is rotated beyond a predetermined point, the spring retains the crankarms and, consequently, the upper plate of the negative stage, in the elevated position relative to the lower plate 72.

It will now be apparent that the entire assembly shown in FIGURES 21 and 22, with the exception of the lift bracket 167, is pivotable about the axis of the stud 200, thereby to tilt the negative stage relative to the optical axis of the apparatus. Furthermore, the negative stage can be opened and closed by rotation of the lever 76, regardless of the angular disposition of the negative stage relative to the focusing block 73. The tilting of the negative stage is effected upon rotation of the knob 80 shown in FIGURE 22 (see also FIGURE 3), as will now be described.

Reference now is made to FIGURE 24 which is a side elevational view of the mechanism for tilting the negative stage, drawn to an enlarged scale and with portions broken away. A generally rectangular housing 208, open at one side, has an integral mounting bracket 209 extending therefrom and provided with two holes. A rod 210, passing through aligned holes formed in the ends of the housing, has a threaded central portion 211 carrying a square nut 212. The upper end of the rod carries a plastic spacer washer 213 and a retainer ring 214, and the knob 80 is secured to this end of the rod, as by a set screw. A reduced-diameter, non-threaded lower portion of the rod, passes through the housing hole but the end of such portion is threaded for receiving a self-locking nut 215. This nut is tightened to press the upper washer 213 and a similar lower washer 216 against the ends of the housing, thereby eliminating axial play between the rod and the housing. Aligned pins 217 and 218 are secured to the nut 212. The pin 217 passes through a guide slot 219 formed in the base of the housing, whereby rotation of the knob in one or the other direction results in an upward or downward travel of the nut 212. Assuming that the pin 218 is retained in a fixed position, rotation of the knob will result in a vertical displacement of the housing relative to the pin. The graduated scale 82 serves to indicate the relative position of the housing to the pin. The described mechanism constitutes a unitary assembly which can be secured to the negative stage by means of screws passing through the holes in the mounting bracket 209. Specifically, and with reference to FIGURE 22, this mounting bracket 109 is secured to the side of the upwardly-extending arm 198 by the screws 220, said arm being integral with the lower plate 72 of the negative stage. The pin 218 extends between the two, flat tongues 190 and 191 which are secured to the tilt bracket 167, such pin also being shown in FIGURE 23 for purposes of reference. The two tongues are brought into engagement with this pin by tightening the nut 194 on the screw 193. Since the tilt bracket 167 is secured in fixed position to the focusing block 73, FIGURE 23, the pin 218 is, effectively, retained in a fixed position relative to such block. However, the mounting bracket 209 is secured to the vertical arm 198 which is pivotable about the pivot pin 200 secured to and extending forwardly from the focusing block. Thus, rotation of the knob 80 results in the rotation of the arm 198, as well as all of the parts carried by such arm, about the axis of the pin 200. The parts carried by the arm 198 are the two crankarms 77 and 77′ (see also FIGURES 2 and 3), the toggle mechanisms operable by the lever 76 and the tilt mechanism housing 208 (FIGURE 22). The lower plate 72, of the negative stage, is integral with the vertical arm 198, and the two crankarms are pivotally coupled to the upper plate 71. It will now be clear that the negative stage can be opened and closed, by rotating the lever 76, irrespective of the angular position of the negative stage relative to the optical axis of the apparatus. The pin 218, of the tilt mechanism (FIGURE 22), is engaged by the two tongues 190 and 191 to eliminate play between the pin and the tongues so that there is no lost motion between rotation of the knob 80 and pivotal movement of the negative stage. The position of the tongue 190, taken with reference to the scale 82, indicates the angular tilt of the negative stage relative to the optical axis. Preferably, the side of this tongue is coated with a distinctive paint. As shown in FIGURE 22, this tongue is aligned with the zero mark on the scale, thereby indicating the negative stage is perpendicular to the light beam of the apparatus.

Figures 25, 26, 27:
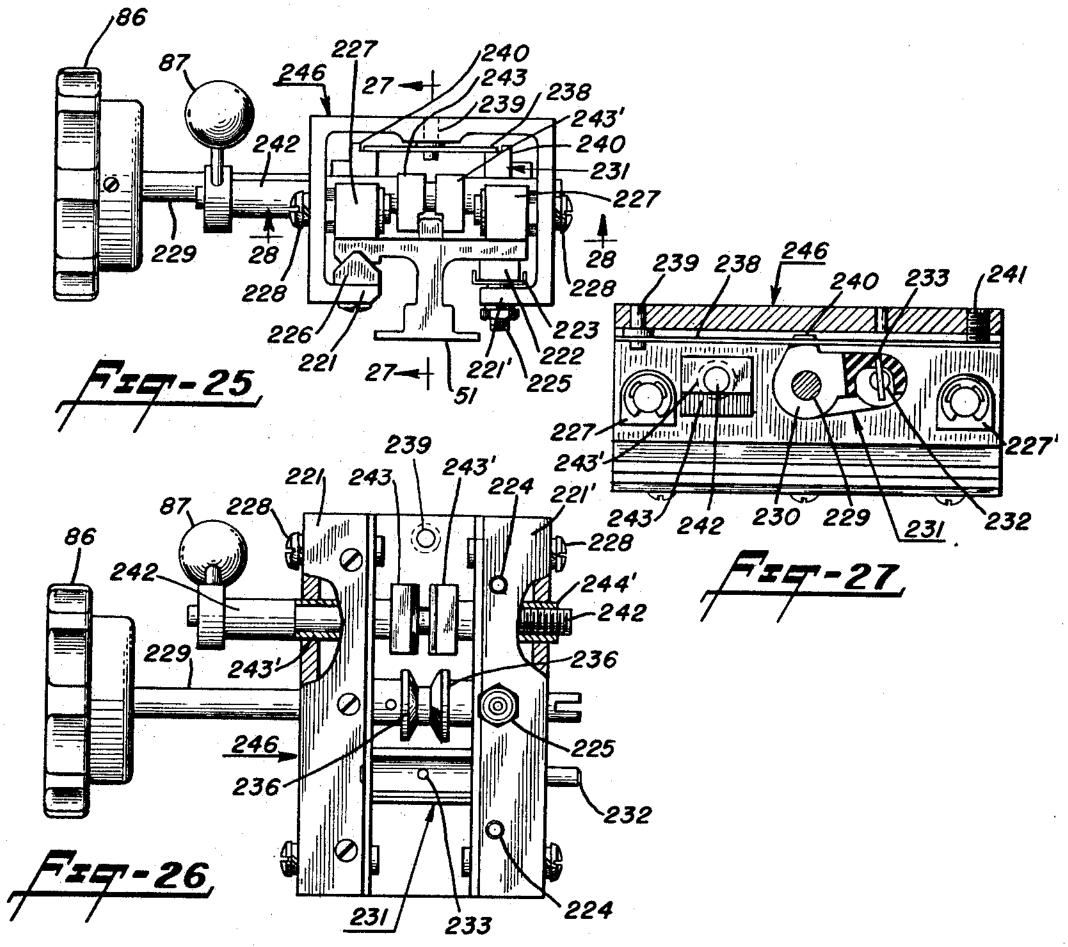
FIGURE 25 is a top plan view of the lens stage focusing block and including the vertical track of the apparatus.
FIGURE 26 is a rear elevational view thereof, but with the vertical track omitted.
FIGURE 27 is a cross-sectional view taken along the line 27—27 of FIGURE 25; with the vertical track and friction roller omitted.

The mechanism for adjusting the lens stage along the vertical track of the apparatus, and for locking the stage in a desired position, will now be described with reference to FIGURES 25–28. Reference first is made to FIGURES 25 and 26, FIGURE 25 being a top plan view of lens stage focusing block 246 and the vertical track 51, and FIGURE 26 being a corresponding rear elevational view but with the vertical track omitted. The focusing block 246 (see also FIGURE 1), is a tubular casting of rectangular cross section having a full length slot in the rear wall thereof, such slot being defined by the facing walls of the co-planar arms 221 and 221'. A rectangular bar 222, made of a plastic, is secured to a metal, channel member 223 having secured thereto a pair of locating pins 224 and a threaded mounting stud 225 by means of which the channel member is secured in place to the arm 221' of the focusing block. Secured to the arm 221, by a plurality of screws, is an elongated bar 226 also made of a plastic material and having a tapered surface corresponding to the V-slot formed in the vertical track 51, said slot being identified by the numeral 163 in FIGURE 20. The two bars 222 and 226 each have a length substantially equal to that of the focusing block. A pair of upper gibs 227, made of plastic, are secured to the opposed side walls of the focusing block by individual fastening screws 228. Each such gib, having a flat surface presented to the vertical track (see FIGURE 27), is loosely carried by a stud having an off-centered, threaded hole for receiving the associated fastening screw. Such stud has a hexagonal portion adjacent the side of the focusing block. By means of an open-end wrench applied to the hexagonal portion of the stud, such stud can be rotated about the axis of the fastening screw, thereby to establish a desired pressure between the gib and the vertical track. A similar pair of lower gibs 227' (see FIGURES 27 and 28) are similarly secured at the lower end of the focusing block. Thus, the vertical track is clamped between the four gibs on the one side and by the two bars 222 and 226 on the other side, the clamping pressure being adjusted to afford a smooth movement of the focusing block along the track upon rotation of the focusing knob 86. The tapered portion of the bar 226 slidable within the V-shaped groove of the track maintains a true longitudinal movement of the block along the track.

Figure 28:
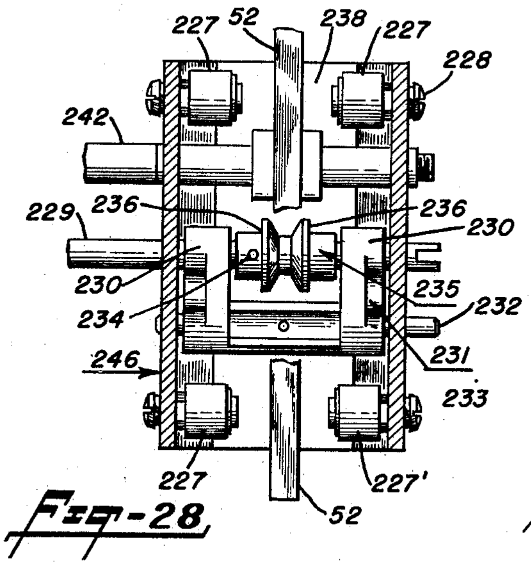
FIGURE 28 is a cross-sectional view taken along the line 28—28 of FIGURE 25.

The shaft 229, carrying the knob 86, passes through enlarged clearance holes formed in the opposed side walls of the focusing block, as well as through aligned holes formed in the spaced arms 230 of a plastic cradle 231, see particularly FIGURES 27 and 28 which are cross-sectional views taken along the lines 27—27 and 28—28 of FIGURE 25, respectively. This cradle is secured to a pivot shaft 232, by a pin 233, which shaft is rotatable within aligned holes formed in the side walls of the focusing block. Positioned between the cradle arms 230 and secured to the shaft 229, by the pin 234, is a unitary, metal, friction roller 235 having facing conical portions 236 which are positioned for engagement with the free edges of the slide bar 52, carried by the vertical track 51. As shown in FIGURES 25 and 27, a flat, rectangular spring 238, having one end secured to the rear wall of the focusing block 246, by a rivet 239, is positioned between two, integral lips 240, extending from the spaced arms 230 of the cradle 231. This spring exerts a considerable pressure against the cradle, which pressure, adjustable by means of the set screw 241, biases the cradle for rotation about an axis defined by the pivot shaft 232 to which the cradle is secured. Since the shaft 229, carrying the friction roller 235, is rotatably carried by the arms 230 of the cradle (FIGURE 28), it will be clear that the flat spring 238 presses the conical portions 236, of the friction roller, into engagement with the edges of the slide bar 52 of the vertical track. The pressure between these conical members and the slide bar is such that rotation of the knob 86 results in a smooth, positive, upward or downward movement of the focusing block along the vertical track.

The lens stage locking lever 87 (see also FIGURE 1), is attached to the shaft 242 which has a reduced-diameter portion passing through the spaced, metal, rectangular clamping blocks 243 and 243' having integral tubular shanks 244 and 244' slidably disposed within aligned holes formed in the side walls of the focusing block 246. A non-threaded portion of this shaft passes through a smooth hole extending through the clamping block 243 and its shank 243'. On the other hand, the shank 244' is provided with a threaded hole receiving the threaded end portion of this shaft. The facing surfaces of the clamping blocks include portions of reduced thickness, which portions are positioned for engagement with the sides of the slide bar 52, as seen in FIGURE 25. The resulting ridges, defining the reduced thickness portions of the clamping blocks, extend partially over the front surface of the slide bar. Thus, although the clamping blocks may be considered to be free floating on the shaft 242, they can rotate about the shaft only to a limited extent, that is, to the point where the ridges strike the front surface of the slide bar. When the lever 87 is in the down, or non-locking position, the clamping blocks exert no pressure against the slide bar and the focusing block is movable along the track upon rotation of the knob 86. When the locking lever is rotated to the up position, the clamping blocks are moved toward the slide bar by reason of the threaded coupling of the shank 244' and the shaft 242 on the one hand, and the collar on the shaft engaging the end of the shank 243' on the other hand. Thus, when the lever is rotated as far as possible to the locking position, the clamping blocks are pressed tightly against the slide bar, thereby retaining the focusing block in a locked position on the vertical track.

Similar focusing and locking mechanisms are carried by the other two focusing blocks of the apparatus. Specifically, and with reference to FIGURE 3, the condenser stage is carried by the focusing block 66, which block is movable along the track by rotating the knob 67 and such stage is locked in a desired position by rotating the locking lever 68 to the illustrated, up position. Likewise, the negative stage, carried by the focusing block 73 (FIGURE 2), is movable along the track by rotating the knob 74 and such stage is locked in a desired position by rotating the locking lever 75 to the illustrated, up position.

Figures 29, 30, 31:
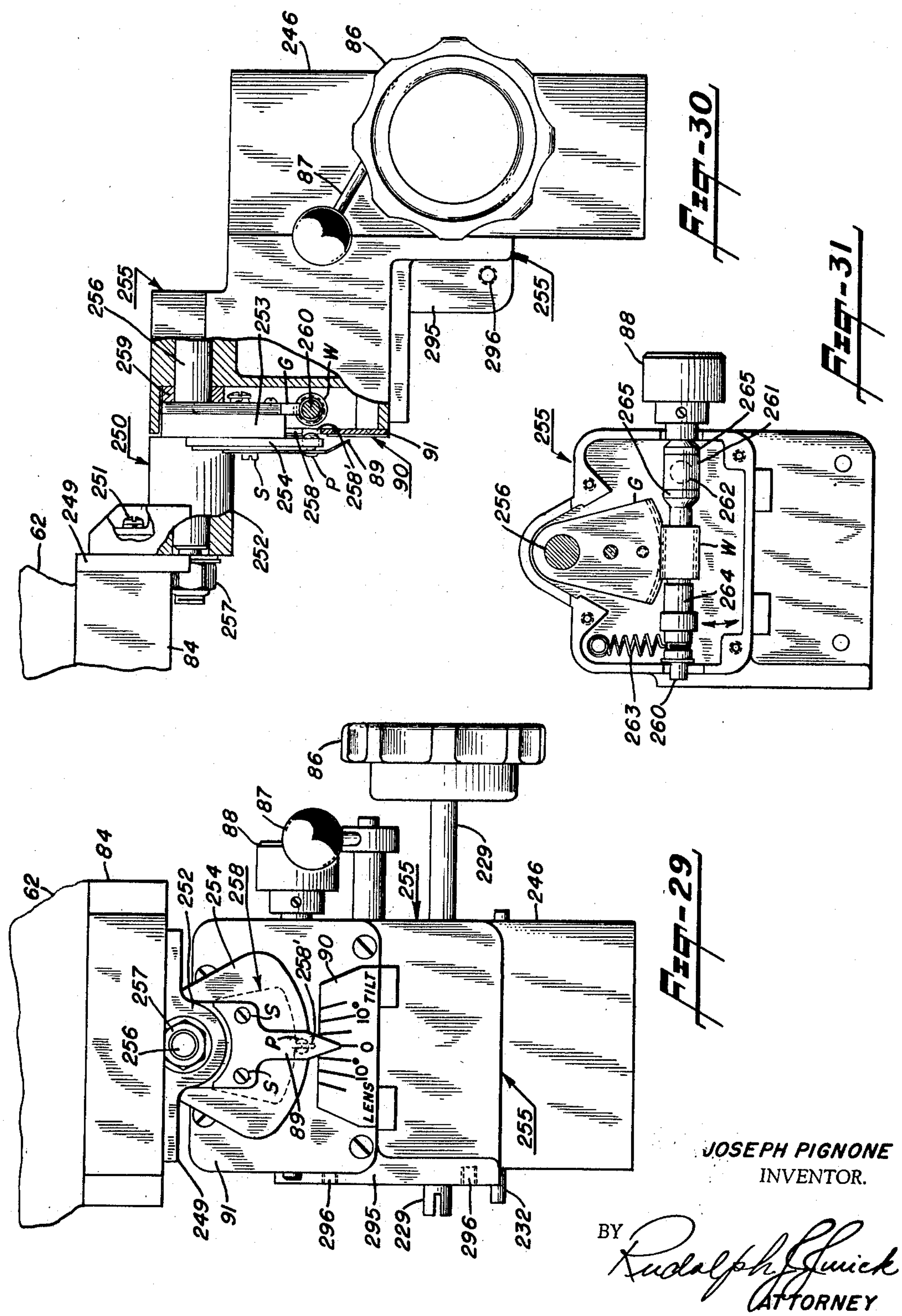
FIGURE 29 is a front elevational view of the lens stage with the filter assembly omitted.
FIGURE 30 is a fragmentary side elevational view thereof, with parts shown in section.
FIGURE 31 is a front elevational view of the housing carrying the mechanism for tilting the lens stage relative to the optical axis of the apparatus.

The construction and assembly of the lens stage and the lens-tilting mechanism will now be described with reference to FIGURES 29–31. The lens housing 84, carrying the bellows 62, includes a flat mounting plate 249, which plate is secured to the vertical arm of a tilt bracket 250 by a plurality of bolts, one such bolt 251 being shown in FIGURE 30. This tilt bracket is a single casting including an intermediate barrel portion 252, a downwardly-depending arm 253 and a sector-shaped plate 254. A cast housing 255 is secured to the focusing block 246 and is provided with a hole into which is force-fitted a heavy stud 256. This stud, carrying a spacer washer 259, passes through a clearance hole formed in the barrel portion 252, of the tilt bracket, and has a threaded end carrying the nut 257 and suitable flat and spring washers. The front end of the housing 255 is an open chamber accommodating a worm gear W in mesh with a sector gear G, which is secured to the downwardly-depending arm 253, as seen in FIGURE 30. The chamber is closed by a cover plate 91 having a sector-shaped opening 258 formed therein, which opening communicates with a radial slot 258'. The arm 253 extends through this opening which is covered by the sector-shaped plate 254. It will be apparent that the tilt bracket 250 and the lens housing 84 constitute an assembly which is rotatable as a unit about the forward portion of the stud 256. It is here pointed out that the sector-shaped opening 258 has a width exceeding that of the arm 253 to permit unobstructed angular movement of such arm within the range somewhat greater than that defined by the scale carried by the scale plate 90 which is secured to the cover 91 (see also FIGURE 1). The angular tilt of the lens stage, relative to the light beam of the apparatus, is indicated by the pointer 89 taken with reference to said scale, said pointer being secured to the sector-shaped plate 254 by means of the screws S. Riveted to the pointer is a pin P which passes through a clearance hole formed in the sector-shaped plate and has an end extending into the radial slot 258'. The pointer is made of a spring material for centering the pin in this slot. When the lens stage is tilted about the stud 256, the pin is forced out of the radial slot and slides along the surface of the scale plate. Thereafter, when the stage is returned to its normal position, the pin will snap into the slot, thereby indicating to the user that the lens stage is normal to the light beam, without necessarily referring to the scale.

FIGURE 31 is a front elevational view of the housing 255 with the cover plate and other components omitted to show the operating assembly of the worm and sector gears. The worm gear W, pinned to the shaft 260 carrying the knob 88, is in mesh with the teeth of the sector gear G, which sector gear is rotatable about the stud 256. The shaft 260 extends through elongated slots formed in the side walls of the housing, as well as through a clearance hole formed in a rectangular bushing 261. This bushing is formed integrally with a cylindrical post 262 having an end journaled for rotation in a circular bore formed in the underlying wall of the housing, thereby forming a fulcrum for the shaft. A spring 263 has one end looped about a fixed post and the other end looped about a tubular bushing 264 loosely carried by the shaft 260. Spacer bushings 265, pinned to the shaft, serve to prevent axial displacement of the shaft relative to the square bushing 261. The spring 263 biases the shaft 260 in a clockwise direction about the pivot axis defined by the post 262, thereby normally maintaining the worm gear in mesh with the sector gear. Thus, rotation of the knob 88 results in rotation of the sector gear about the stud 256. By pressing upwardly against the knob 88, the shaft 260 pivots about the axis of the post 262 resulting in the disengagement of the gears, thereby to permit quick centering of the lens stage.

The construction and assembly of the condenser stage will now be described with reference to FIGURES 32–38. Shown in the top plan view (FIGURE 32) and the side elevational view (FIGURE 34) is the focusing block 66 (carrying the various components for effecting movement of the condenser stage along the vertical track of the apparatus), the focusing knob 67 and the locking lever 66, see also FIGURE 3. The lift bracket 65 is secured to the focusing block by the four screws 266, a front elevational view of such bracket being shown in FIGURE 35. This bracket is a single casting having end lugs 267, 267' and two, forwardly-extending arms 268, 268', each of said arms having a V-shaped channel formed therein and extending the full length thereof. Extending through the end lug 267 is a hole 275, the upper end of said hole being closed by a cap 269 and the lower end of the hole being spanned by a screw 270. Slidably disposed within the hole is a plastic plug 271 supported on a coiled spring 272. Formed in the forward wall of the end lug 267 is a vertical slot 273, which slot communicates with the hole 275. The function of the plug and spring will be described below, it here being pointed out that the other end lug 267' is of identical construction and carries the plug 271' and the spring 272'.

Figure 33:
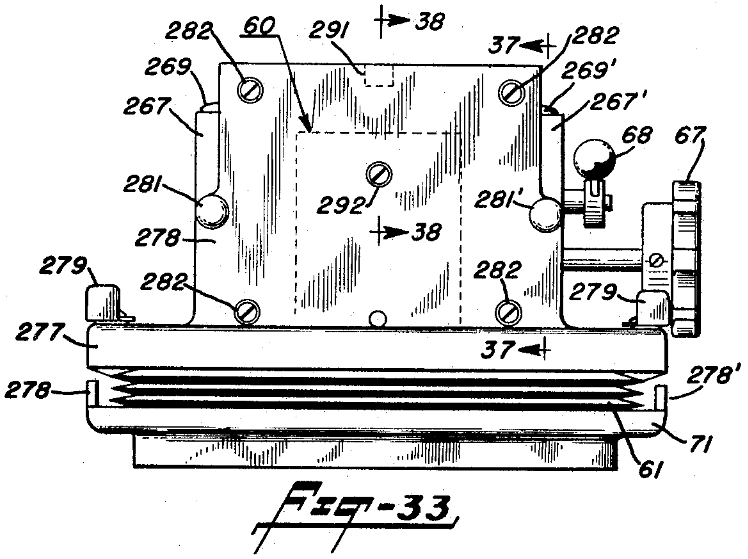
FIGURE 33 is a front elevational view thereof.
Figure 35:
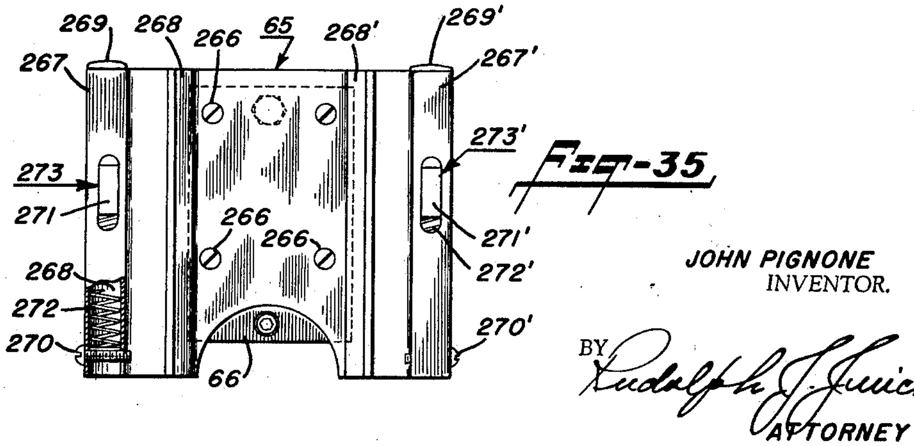
FIGURE 35 is a front elevational view of the condenser stage lift bracket.
Figure 34:
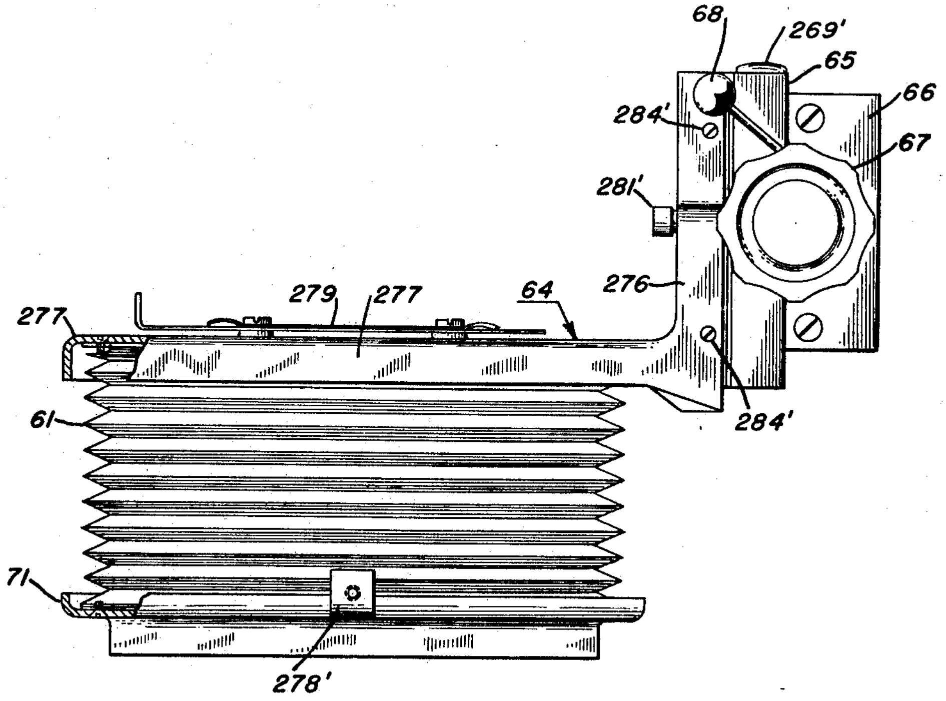
FIGURE 34 is a side elevational view thereof.

The condenser stage mounting bracket (generally identified by the numeral 64 in FIGURE 3) is a single casting comprising the vertical leg 276 and the horizontal plate 277 having downwardly-depending side walls. The upper end of the bellows 61 is secured to the plate 277 by a plurality of countersunk screws as shown in the broken away portion of FIGURE 34. Similarly, the lower end of the bellows is secured to the horizontal plate 71 which comprises the upper plate of the negative stage. As shown in FIGURES 33 and 34, this plate 71 includes two, upwardly-extending ears 278, 278' provided with threaded holes. These holes receive the screws which pivotally couple the plate 71 to the two crankarms 77 and 77' shown in FIGURES 2 and 3, respectively. The condenser box 79, shown in FIGURE 2, is removably secured to the horizontal arm 277, FIGURES 34 and 35, by means of conventional latching mechanisms 279.

Figure 32:
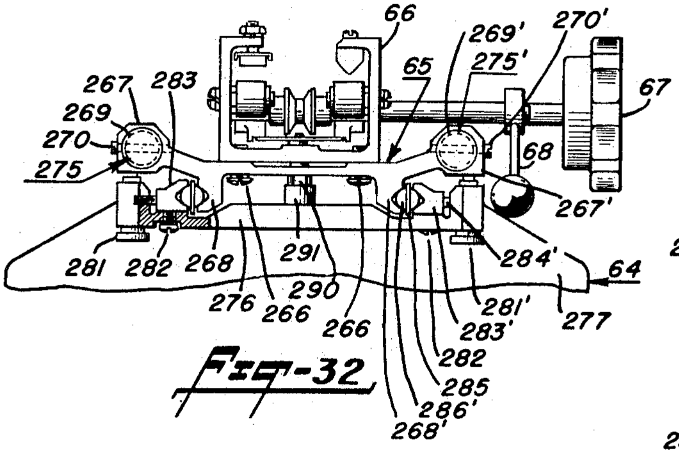
FIGURE 32 is a top plan view of the condenser stage assembly with portions broken away.
Figure 36:
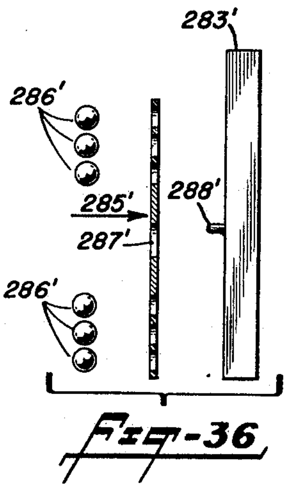
FIGURE 36 is an exploded view showing the components of one ball bearing assembly affording vertical movement of the condenser stage relative to its focusing block.

Referring particularly to FIGURES 32 and 33, two thumb screws 281, 281' are threaded into holes provided in the vertical legs 276 of the condenser stage mounting plate 64, each such screw having a reduced-diameter, non-threaded tip passing through the proximate vertical slots 273 and 273' formed in the lift bracket 65 (see FIGURE 35), for purposes which will be described below. Secured to the rear surface of the vertical leg 276, by the screws 282, are two vertical bars 283, 283' having a length equal to the heighth of the said leg and provided with V-shaped channels presented to the similar channels formed in the forwardly-extending arms 268, 268' of the lift bracket 65. Referring particularly to the vertical bar 283', such bar is brought into precise parallelism with the arm 268' by adjustment of two set screws 284', one such screw being visible in FIGURE 32 and both screws being visible in FIGURE 34. The other vertical bar 283 is similarly adjusted to precise parallelism with the lift bracket arm 268. The mounting plate 64 and the lift bracket 65 are separate units mechanically coupled together only by means of two ball bearing assemblies operable within the described V-shaped channels. As shown in the exploded view of FIGURES 36, one such ball bearing assembly comprises a metal ball retainer plate 285' provided with six clearance holes, for the plastic balls 286' and a central hole 287' for accommodating a pin 288' secured to the vertical bar 283'. In the assembled condition, FIGURE 32, the balls 286' engage the walls of the V-shaped channels formed in the vertical bar 283' and the lift bracket arm 268', said balls being retained in spaced, vertical positions by the retainer plate 285'. The vertical displacement of the retainer plate, relatively to the vertical bar 283', is limited by the pin carried by this bar and extending through the central hole of the retainer plate. It will be noted that the side edges of the retainer plate project into the clearance space between the bar 283' and the arm 268', thereby limiting the extent of which this plate can rotate about a vertical axis. A similar ball bearing assembly is operable within the facing, V-shaped channels formed in the vertical bar 283 and the lift bracket arm 268. The described arrangements provide the means whereby the condenser stage mounting plate 64 is movable in a vertical plane relative to the lift bracket 65, irrespective of the position of the focusing block along the vertical track of the apparatus. Such relative movement between the mounting plate and the lift bracket is limited by a hexagonal post 290 which is secured to the lift bracket and positioned between an integral boss 291 formed at the upper end of the vertical leg 276, of the mounting plate 64, and a screw 292 carried by such leg, see FIGURE 38 which is a cross-sectional view taken along the line 38—38 of FIGURE 33.

Figure 37:
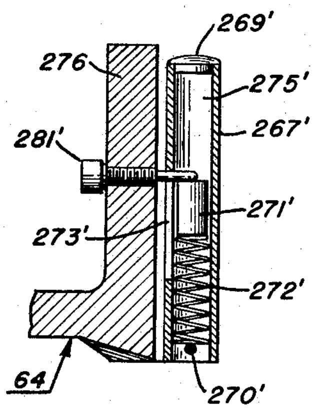
FIGURE 37 is a cross-sectional view taken along the line 37—37 of FIGURE 33.
Figure 38:
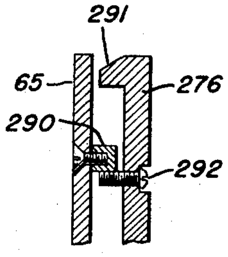
FIGURE 38 is a cross-sectional view taken along the line 38—38 of FIGURE 33.

Attention again is directed to the two thumb screws 281 and 281' (FIGURES 32 and 33) which are threaded through holes provided in the vertical leg 278, of the mounting bracket 64, and have ends passing into the holes formed in the end lugs 267 and 267' of the lift bracket. FIGURE 37, which is a cross-sectional view taken along the line 37—37 of FIGURE 33, shows the non-threaded end of the thumb screw 281' passing through the elongated slot 273' formed in the end lug 267'. The end of this screw extends into the circular hole 275' and is engaged by the plastic plug 271' supported by the compressed spring 272'. Similarly, the end of the thumb screw 281, FIGURE 33, is engaged by the plastic plug 271 supported by the spring 272, FIGURE 35. Normally, these two springs bias the condenser stage mounting plate upwardly relative to the lift bracket to the point where the ends of the thumb screws engage the upper wall defining the elongated slots in the end lugs, as illustrated in FIGURE 37. However, when the condenser stage 79 and the lamp housing 58 (see FIGURE 2) are assembled on the mounting plate, the added weight thereof results in the compression of the springs, whereby the ends of the two thumb screws normally lie at some point intermediate of the ends of the elongated slots. Thus, in the assembled apparatus, the mounting plate 64, and the components supported by such plate, can be displaced upwardly to a limited extent, even though the focusing block remains in a locked position on the vertical track of the apparatus. Such displacement of the condenser stage, relative to the focusing block, permits the negative stage to be opened when the bellows 61 are in the fully collapsed position.

In FIGURE 34, the bellows 61 are shown in an extended position. When the bellows are partially or fully extended, they will merely collapse when the negative stage is opened. More specifically, the upper plate 71 and the collar 73*a*, of the negative stage (see FIGURE 2) are raised relative to the lower plate 72 by rotating the lever 76 in a counter-clockwise direction, whereby a negative can be inserted into position in the light beam. The crankarm 77 is pivotally coupled to the upper plate 71 by means of a screw passing through an elongated slot, formed in the end of the crankarm, and threaded into a hole provided in an upstanding ear which is integral with the plate 71. The other crankarm 77′, FIGURE 3, is similarly coupled to a second, similar, upstanding ear. These two ears are shown in FIGURES 33 and 34 and are identified by the numerals 278 and 278′. When the bellows 61 are fully collapsed, these ears come into contact with the overlying side walls of the horizontal plate 277 of the condenser stage mounting plate 64. Under this condition, rotation of the lever 76 (FIGURE 2) results in a vertical displacement of the condenser stage and lamp housing relative to the lift bracket 65, which bracket is secured in fixed position to the focusing block 66. Such vertical displacement of the mounting plate 64 is afforded by the described construction wherein this plate is supported by the two springs 271 and 271′ (FIGURE 35) by means of the thumb screws 281 and 281′. Taking into consideration the total weight supported by the mounting plate 64, these springs are so designed that the amount of movement between this plate and the lift bracket 65 is sufficient to permit a full opening of the negative stage, that is, to an extent where the toggle mechanisms, associated with the lever 76, will retain the negative stage in the open position, as has already been described.

Attention again is directed to FIGURE 29. It will be noted that the ends of the pivot shaft 232 and the focusing shaft 229 project a substantial distance beyond the side wall of the focusing block 246, the shaft 229 having an end slot formed therein. Referring specifically to FIGURES 29 and 30, it will also be noted that the casting 255, which is secured in fixed position to the focusing block 246, includes a mounting boss 295 provided with two threaded holes 296. When power focusing of the lens stage is desired, a reversible, electric motor is mounted onto the boss 295 with its drive shaft coupled to the slotted end of the focusing shaft 229, as will now be described with reference to FIGURES 39–42.

Figure 42:
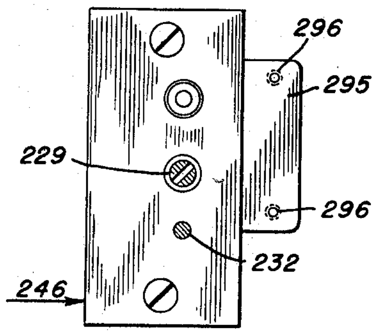
FIGURE 42 is a sectional view taken along the line 42—42 of FIGURE 39.
Figure 39:
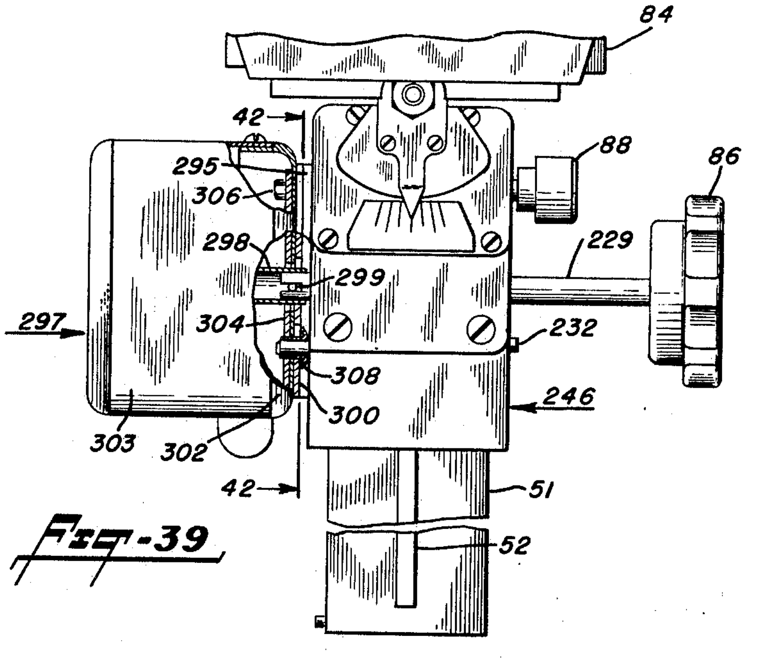
FIGURE 39 is a front elevational view of the lens stage with a lens-focusing motor attached thereto.
Figures 40, 41:
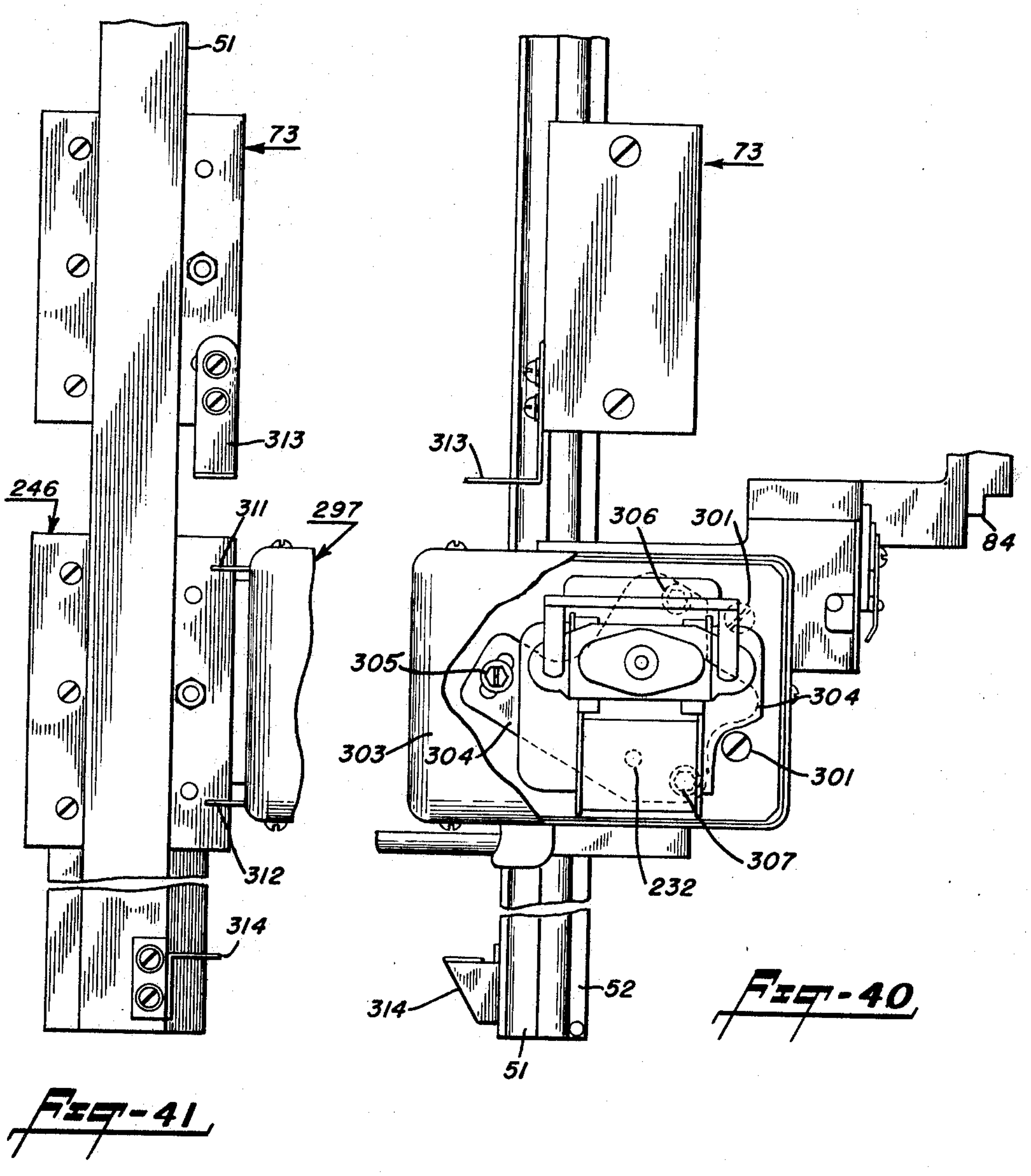
FIGURE 40 is a corresponding, left side elevational view with the motor cover broken away and including a portion of the negative stage.
FIGURE 41 is a fragmentary, rear elevational view corresponding to FIGURE 40.

Referring first to FIGURES 39 and 42 (FIGURE 42 being a sectional view taken along the line 42—42 of FIGURE 39), there are shown the mounting boss 295 and the ends of the shafts 229 and 232 protruding from the side wall of the lens focusing block 246. A reversible motor, generally identified by the numeral 297 in FIGURE 39, has a hollow hub 298 secured to its drive shaft, which hub has a coupling pin 299 force-fitted into diametrically-aligned holes formed therein. This coupling pin extends into the slot of the shaft 229, whereby such shaft will rotate when the motor is energized. A rectangular mounting plate 300, provided with a clearance hole for the motor hub, is firmly secured to the boss 295 by means of two screws, which screws are not visible in the particular view of FIGURE 39, but are identified by the numeral 301 in FIGURE 40. The motor is enclosed by a housing comprising a cup-like base 302 having a cover 303 fastened thereto by a plurality of screws. Disposed inside of the housing base 302 is a plate 304, of irregular shape as seen in FIGURE 40, thereby to provide access to the screws 301. This plate 304 is secured to the rectangular plate 295 by the three screws 305, 306 and 307, said screws passing through clearance holes formed in the housing base 302 and into threaded holes formed in the rectangular plate 300. A hollow rivet 308, FIGURE 39, has a shank force-fitted into aligned holes formed in the exterior rectangular plate 300, the housing base 302 and the irregularly-shaped, interior plate 304, said rivet receiving the protruding end of the pivot shaft 232. The motor per se, that is, the field, field coils and armature, is carried by and secured in fixed position to the plate 304, said plate, however, being adjustable relative to the rectangular plate 300 upon loosening of the three screws 305–307. For this purpose, the screw 305 passes through a slot formed in the plate 304 and the other two screws pass through oversize holes, each screw carrying a flat washer. Such adjustment of the plate 304 is a pivotal displacement about the rivet 308. Since this rivet fits snugly over the protruding end of the shaft 232, the adjustment of the plate is an angular rotation about the axis of this shaft. It will be apparent that the motor is a complete operative device, which can be attached to the apparatus by the user.

To attach the motor to the focusing block, the cover 303 is removed and the three screws 305–307 are loosened slightly. The rivet 308 is guided over the end of the shaft 232 and, at the same time, the focusing knob 86 is rotated to assure movement of the pin 299 into the shaft slot. While pressing the motor against the focusing block the two mounting screws 301 are threaded tightly into the holes of the boss 295. The knob 86 now is rotated to be sure there is no binding or slippage, after which the plate 304 is secured in place by tightening the screws 305–307. As has been described hereinabove with reference to FIGURES 25–28, to which reference again is made, the friction roller 235, carried by the cradle 231 which is pivotable about the shaft 232, is pressed against the slide bar 52, of the vertical track, with a considerable pressure by the flat spring 238. This pressure remains constant as the focusing block is moved along the vertical track upon rotation of the knob 86. The described motor mounting arrangement, FIGURES 39 and 40, assures a precise alignment of the motor drive shaft with the focusing shaft after the motor housing has been secured to the focusing block. Thus, the normal angular position of the focusing shaft 292 relative to the pivot shaft 232 is preserved, whereby the initial pressure of the friction roller against the slide bar is not altered. Consequently, a smooth, positive displacement of the focusing block along the vertical track is effected either by manual rotation of the focusing knob or by energizing the focusing motor. Although not shown in the drawings, it is here pointed out that the motor leads 311 (FIGURE 40), are connected to the terminal block 97 shown in FIGURE 4. By suitable jumper leads, connected between the terminal blocks 97 and 99 the motor leads are connected to brushes which are in sliding contact with the bus bars carried by the frame member 12, whereby energization of the motor for rotation in one or the other direction is controlled by means of the focus control switch 27 (FIGURE 1), carried by the front panel of the apparatus.

Referring now to FIGURES 40 and 41, the motor 297 is provided with two limit switches having operating levers 311 and 312 which extend through openings formed in the motor housing. These levers extend along and are spaced from the rear wall of the focusing block 246. An L-shaped stop 313 is secured to the negative stage focusing block 73 and lies in the path of travel of the upper lever 311. A lower stop 314, lying in the path of travel of the lever 312, is secured to the rear surface of the vertical track 51. Upon movement of one or the other switch lever into engagement with the associated stop, the motor circuit is opened, thereby terminating movement of the focusing block 246 in that particular direction.

Having now described the invention, those skilled in this art will be able to make various changes and modifications without thereby departing from the scope and spirit of the invention as recited in the following claims.

I claim:

1. Photographic enlarger apparatus comprising,
a pair of spaced frame members extending upwardly from a base,
a gear rack secured to each frame member,
a plurality of contact bars carried by one of the frame members,
a carriage member positioned between the frame members and including spaced shafts, one shaft having secured thereto end gears which are in mesh with the gear racks,
a plurality of contact brushes carried by the carriage member, each brush having an end in sliding engagement with one of the contact bars,
a vertical track removably secured to the carriage member,
focusing blocks carried by and normally slidable along the said track,
individual locking means associated with each focusing block and operable to lock the focusing block in fixed position to the track,
a condenser stage, a negative stage and a lens stage, each stage being secured to one focusing block, and
means for rotating the said one shaft thereby to effect movement of the carriage member along the frame members,
wherein first, second and third pairs of complementary, longitudinal channels are formed in the frame members, wherein the said contact bars are disposed in the first pair of channels, wherein the said spaced shafts carry end rollers having peripheral surfaces in engagement with walls defining the second pair of channels, and wherein both of the frame members carry gear racks which are disposed in the third pair of channels.

2. The invention as recited in claim 1, including elongated insulator members disposed within the first pair of channels, each insulator member having formed therein a plurality of parallel channels, and wherein each of said contact bars is of generally V-shape and disposed within one of the parallel channels.

3. The invention as recited in claim 2, wherein each of the contact brushes has a bi-furcated end terminating in arcuate tip portions, which tip portions are in sliding engagement with opposed inner walls of the associated contact bar.

4. Photographic enlarger aparatus comprising,
a pair of spaced frame members extending upwardly from a base,
a gear rack secured to each frame member,
a plurality of contact bars carried by one of the frame members,
a carriage member positioned between the frame members and including spaced shafts, one shaft having secured thereto end gears which are in mesh with the gear racks,
a plurality of contact brushes carried by the carriage member, each brush having an end in sliding engagement with one of the contact bars,
a vertical track removably secured to the carriage member,
focusing blocks carried by and normally slidable along the said track,
individual locking means associated with each focusing block and operable to lock the focusing block in fixed position to the track, a condenser stage, a negative stage and a lens stage, each stage being secured to one focusing block, and
means for rotating the said one shaft thereby to effect movement of the carriage member along the frame members,
including first cooperating means carried by the negative stage and its focusing block and manually operable to tilt the negative stage relative to the vertical track; and second cooperating means carried by the lens stage and its focusing block and manually operable to tilt the lens stage relative to the vertical track.

5. The invention as recited in claim 4, wherein the negative stage includes a horizontally disposed plate terminating in a vertical arm, and wherein the said first cooperating means comprises means pivotally securing the said vertical arm to the focusing block; a threaded rod rotatably carried by a mounting member and having a knob attached to one end thereof; a nut threaded onto the rod; means securing said mounting member in fixed position relative to the said vertical arm; and means securing the said nut in fixed position relative to the focusing block.

6. The invention as recited in claim 5, including a fiducial mark associated with the said nut and cooperating with a calibrated scale carried by the said mounting member.

7. The invention as recited in claim 4, wherein the lens stage comprises a lens housing secured to a tilt bracket, and wherein the said second cooperating means comprises a mounting bracket secured to the associated focusing block; means pivotally mounting the said tilt bracket to the said mounting bracket; a sector gear secured to the tilt bracket; an operating shaft extending through aligned holes formed in the mounting bracket and having a knob attached to one end thereof; and a worm gear secured to the operating shaft and in mesh with the sector gear.

8. The invention as recited in claim 7, wherein the sector and worm gears are disposed within a chamber formed in said mounting bracket, wherein the said aligned holes are elongated and formed in opposed walls of the chamber; and including means supporting the operating shaft for pivotal movement in the plane containing the sector gear; and spring means biasing the operating shaft in a direction to maintain the worm gear in mesh with the sector gear.

9. The invention as recited in claim 8, including a pointer secured to the said tilt bracket and cooperating with a calibrated scale carried by the said mounting bracket.

10. Photographic enlarger apparatus comprising,
a pair of spaced frame members extending upwardly from a base,
a gear rack secured to each frame member,
a plurality of contact bars carried by one of the frame members,
a carriage member positioned between the frame members and including spaced shafts, one shaft having secured thereto end gears which are in mesh with the gear racks,
a plurality of contact brushes carried by the carriage member, each brush having an end in sliding engagement with one of the contact bars,
a vertical track removably secured to the carriage member,
focusing blocks carried by and normally slidable along the said track,
individual locking means associated with each focusing block and operable to lock the focusing block in fixed position to the track,
a condenser stage, a negative stage and a lens stage, each stage being secured to one focusing block, and
means for rotating the said one shaft thereby to effect movement of the carriage member along the frame members,
wherein the negative stage comprises a lower, horizontally disposed plate; an upper, horizontally disposed plate having an integral collar normally resting upon the lower plate; and a spring biased toggle mechanism mechanically coupled between the said upper and lower plates and including a pivotally supported operating lever; said toggle mechanism effecting a parallel movement of the said collar away from the lower plate upon pivotal movement of the operating lever and retaining the collar in spaced position to the lower plate upon pivotal movement of the operating lever beyond a predetermined point.

11. The invention as recited in claim 10, wherein the condenser stage includes a horizontally disposed support plate, and including a bellows having ends secured to the said support plate and the upper plate of the negative stage; and a pair of ears extending upwardly from opposed side edges of the said upper plate, said ears each having a length at least equal to the height of the bellows when fully collapsed.

12. Photographic enlarger apparatus comprising, a pair of spaced frame members extending upwardly from a base, a gear rack secured to each frame member, a plurality of contact bars carried by one of the frame members, a carriage member positioned between the frame members and including spaced shafts, one shaft having secured thereto end gears which are in mesh with the gear racks, a plurality of contact brushes carried by the carriage member, each brush having an end in sliding engagement with one of the contact bars, a vertical track removably secured to the carriage member, focusing blocks carried by and normally slidable along the said track, individual locking means associated with each focusing block and operable to lock the focusing block in fixed position to the track, a condenser stage, a negative stage and a lens stage, each stage being secured to one focusing block, and means for rotating the said one shaft thereby to effect movement of the carriage member along the frame members, wherein the condenser stage includes a horizontally-disposed plate terminating in a vertical plate, and including a lift bracket secured in fixed position to the focusing block, said lift bracket including a pair of tubular, vertically-disposed end lugs; means forming elongated entrance slots in corresponding wall portions of the end lugs; a coiled spring disposed within each of the end lugs; a pair of thumb screws carried by said vertical plate, each screw having an end passing through one of said entrance slots and extending over the associated spring; and a pair of spaced coupling mechanisms slidably coupling said vertical plate to said lift bracket.

13. The invention as recited in claim 12, wherein each coupling mechanism comprises a first vertical bar on the lift bracket; a second vertical bar secured to said vertical plate and spaced laterally from the first bar; complementary, V-shaped grooves formed in the vertical bars; means adjustable to set the second bar precisely parallel to the first bar; a ball-retainer plate positioned between the vertical bars and having a plurality of holes formed therein; means limiting vertical displacement of the retainer plate relative to the vertical bars; and a plurality of bearing balls, each ball passing through one of the holes in the retainer plate and engaging the side walls of both said grooves.

14. The invention as recited in claim 13, including cooperating means carried by the said lift bracket and vertical plate to limit the relative vertical displacement therebetween; and a plug slidably disposed within each end lug and positioned between the associated spring and the end of the associated thumb screw.

15. Photographic enlarger apparatus comprising, a pair of spaced frame members extending upwardly from a base, a gear rack secured to each frame member, a plurality of contact bars carried by one of the frame members, a carriage member positioned between the frame members and including spaced shafts, one shaft having secured thereto end gears which are in mesh with the gear racks, a plurality of contact brushes carried by the carriage member, each brush having an end in sliding engagement with one of the contact bars, a vertical track removably secured to the carriage member, focusing blocks carried by and normally slidable along the said track, individual locking means associated with each focusing block and operable to lock the focusing block in fixed position to the track, a condenser stage, a negative stage and a lens stage, each stage being secured to one focusing block, and means for rotating the said one shaft thereby to effect movement of the carriage member along the frame members, wherein the said track comprises a leg portion terminating in diverging cross arm portions presenting a generally T-shaped configuration in cross-section; means forming a V-shaped vertical groove in the inner surface of one cross arm portion; and a generally-rectangular slide bar secured to the track centrally of the cross arm portions and aligned with the leg portion; and wherein each focusing block comprises a generally-rectangular, tubular member having a full length slot formed in the rear wall thereof; a pivot shaft extending through aligned holes formed in the side walls of the tubular member; a cradle member carried by said pivot shaft and including spaced arms having aligned holes formed therein; a focusing shaft carrying a knob, said shaft passing through the aligned holes formed in the arms of the cradle member and through enlarged holes formed in the side walls of the tubular member; a roller member secured to said focusing shaft and positioned between the arms of the cradle member, said roller member having spaced, conical surfaces directed toward each other; spring means biasing the cradle member in a direction to press the conical surfaces of the roller member into engagement with the edges of the said slide bar; a first plastic bar secured to the tubular member and having a tapered surface in contact with the wall defining the V-shaped groove formed in the said one cross arm portion of the track; a second plastic bar secured to the tubular member and having a flat surface in contact with inner surface of the other cross arm portion of the track; a plurality of plastic guide members each having a flat surface portion in contact with the outer surfaces of the said cross arm portions; and individual mounting means securing each said guide member to a side wall of the rectangular member, each such mounting means being adjustable to vary the pressure exerted by the guide member against the track.

16. The invention as recited in claim 15, wherein each of the said locking means comprises an operating lever secured to a locking shaft which passes through aligned holes formed in the side walls of the tubular member; a pair of clamping members carried by the locking shaft and disposed on opposite sides of the said slide bar; and cooperating means formed on the locking shaft and the clamping members and effecting movement of the clamping members toward and away from each other upon rotation of the locking shaft in one or the other direction.

17. The invention as recited in claim 15, wherein each of the said locking means comprises a pair of spaced, clamping blocks disposed on opposite sides of the said slide bar and having aligned holes formed therein; a tubular shank extending from each clamping block and passing through aligned holes formed in the side walls of the tubular member, one shank having a smooth internal wall and the other shank having an internal thread; and a locking shaft carrying a lever, said shaft having a reduced-diameter portion passing through the said one shank and through the aligned holes of the clamping blocks and said shaft having a threaded end portion upon which the said other shank is threaded.

18. The invention as recited in claim 17, wherein the said clamping blocks are rectangular plates having complementary portions directed toward each other and overlying the front wall of the slide bar and complementary, reduced-thickness portions extending along the side walls of the slide bar.

19. In photographic enlarger apparatus of the class comprising a lens stage carried by a focusing block mounted for sliding movement along a vertical track, the improvement comprising, (a) a tilt bracket secured to the lens stage,
(b) a mounting bracket secured in fixed position to the focusing block and having a chamber formed therein,
(c) means pivotally mounting the tilt bracket to the mounting bracket,
(d) a sector gear disposed in the chamber and secured to the tilt bracket,
(e) an operating shaft extending through elongated holes formed in opposed side walls of the chamber,
(f) a worm gear secured to the operating shaft,
(g) means supporting the shaft for pivotal movement in the plane of the sector gear,
(h) spring means biasing the operating shaft in a direction to maintain the worm gear in mesh with the sector gear, and
(i) a pointer secured to the tilt bracket and cooperating with a calibrated scale carried by the mounting bracket.

20. In photographic enlarger apparatus of the class comprising a negative stage carried by a focusing block mounted for sliding movement along a vertical track, an improved negative stage comprising, (a) a horizontally-disposed lower plate terminating in a vertical arm,
(b) means pivotally securing said vertical arm to the focusing block,
(c) an upper horizontally-disposed plate having an integral collar normally resting upon the lower plate,
(d) a spring-biased toggle mechanism mechanically coupled to said upper and lower plates and including a pivotally-supported operating lever, said mechanism effecting a movement of said collar away from said lower plate upon pivotal movement of the operating lever,
(e) a threaded rod rotatably carried by a mounting member and having a knob attached to one end thereof,
(f) a nut threaded onto said rod,
(g) means securing said mounting member in fixed position relative to the said vertical plate,
(h) means securing the said nut in fixed position relative to said focusing block, and
(i) a fiducial mark associated with said nut and cooperating with a calibrated scale carried by said mounting member.

21. In photographic enlarger apparatus of the class comprising a condenser stage carried by a focusing block mounted for sliding movement along a vertical track, the improvement comprising, (a) a horizontally-disposed plate supporting the condenser stage and terminating in a vertical plate,
(b) a lift bracket secured in fixed position to the focusing block, said lift bracket including a pair of tubular vertically-disposed end lugs,
(c) means forming elongated entrance slots in corresponding wall portions of the end lugs,
(d) a coiled spring disposed within each end lug,
(e) a pair of thumb screws carried by the said vertical plate, each screw having an end passing through one of said entrance slots and extending over the associated spring,
(f) a first pair of vertical bars on the lift bracket, each bar having a V-shaped groove formed therein,
(g) a second pair of vertical bars secured to the said vertical plate, each said bar having a V-shaped groove formed therein and each such bar being laterally spaced from and parallel to a corresponding one of the first pair of bars with the grooves presented toward each other,
(h) a ball retainer plate positioned between each set of spaced bars, each retainer plate having a plurality of holes formed therein,
(i) a first set of bearing balls passing through the holes of one retainer plate and in engagement with the facing walls of the grooves formed in one set of bars, and
(j) a second set of bearing balls passing through the holes in the other retainer plate and in engagement with the facing walls of the grooves formed in the other set of bars.

22. In photographic enlarger apparatus of the class comprising a focusing block mounted for sliding movement along a vertically-disposed track, the improvement comprising, (a) a track comprising a leg portion terminating in diverging cross arm portions presenting a generally T-shaped configuration in cross section,
(b) a V-shaped groove formed in the inner surface of one of said cross arm portions, the inner surface of the other cross arm portion being flat,
(c) a generally-rectangular slide bar secured to the track centrally of the cross arm portions and aligned with the leg portion,
(d) a generally-rectangular, hollow focusing block having a full length slot formed in the rear wall thereof,
(e) a pivot shaft extending through aligned holes formed in the side walls of the focusing block,
(f) a cradle member carried by the pivot shaft and including spaced arms having aligned holes formed therein,
(g) a focusing shaft carrying a knob, said shaft passing through the aligned holes formed in cradle members and through enlarged holes formed in the side walls of the focusing block,
(h) a roller member secured to the focusing shaft and positioned between the arms of the cradle member, said roller member having spaced, conical surfaces directed toward each other and positioned on opposite sides of the slide bar,
(i) spring means biasing the cradle member in a direction to press the conical surfaces of the roller member into engagement with the edges of said slide bar,
(j) a first plastic bar secured to the focusing block and having a tapered surface in contact with the wall defining the said V-shaped groove,
(k) a second plastic bar secured to the focusing block and having a flat surface in contact with the inner surface of the said other cross arm portion,
(l) a plurality of plastic guide members each having a flat surface in contact with the outer surfaces of the said cross arm portions, and (m) individual mounting means securing each guide member to a side wall of the focusing block, each such mounting means being adjustable to vary the pressure exerted upon the track by the associated guide member.

23. The invention as recited in claim 22, including a pair of clamping blocks disposed on opposite sides of the slide bar and having aligned holes formed therein; a tubular shank extending from each clamping block and passing through aligned holes formed in the side walls of focusing block, one shank having a smooth inner wall and the other shank having an integral thread; and a locking shaft carrying a lever, said shaft having a reduced-diameter portion passing through the said one shank and through the aligned holes formed in the clamping blocks, and said shaft having a threaded end portion upon which the other shank is threaded.

24. The invention as recited in claim 23, wherein the said spring means comprises a flat spring engaging the arms of said cradle member and having one end secured to the front wall of the focusing block; and an adjusting screw carried by the focusing block and having an end in engagement with the other end of the flat spring.

25. The invention as recited in claim 23, wherein corresponding ends of said pivot shaft and focusing shaft project beyond the outer wall of the focusing block, and the projecting end of the focusing shaft has a slot formed therein; and in combination with an electric motor carried by a first mounting plate; a second mounting plate; a hollow rivet pivotally securing together the two mounting plates; a hollow hub secured to the drive shaft of the motor and passing through aligned clearance holes formed in the two mounting plate; a coupling pin carried by the hub; means securing the second mounting plate to the focusing block with the projecting end of pivot shaft extending into said hollow rivet and the said coupling pin disposed within the said slot, and means securing the first mounting plate in fixed position to the second mounting plate.

References Cited

UNITED STATES PATENTS 3,052,156 9/1962 Blatherwick --------- 355—62

NORTON ANSHEN, Primary Examiner

R. A. WINTERCORN, Assistant Examiner

U.S. Cl. X.R.

355—52